(12) United States Patent
Murata et al.

(10) Patent No.: US 7,917,020 B2
(45) Date of Patent: Mar. 29, 2011

(54) INFORMATION PROCESSING DEVICE AND METHOD, PHOTOGRAPHING DEVICE, AND PROGRAM

(75) Inventors: Makoto Murata, Tokyo (JP); Masatomo Kurata, Tokyo (JP); Yoshihiro Yamaguchi, Tokyo (JP); Brian Clarkson, Tokyo (JP)

(73) Assignee: Sony Corporation, Tokyo (JP)

( * ) Notice: Subject to any disclaimer, the term of this patent is extended or adjusted under 35 U.S.C. 154(b) by 1048 days.

(21) Appl. No.: 11/444,467

(22) Filed: Jun. 1, 2006

(65) Prior Publication Data

US 2006/0291840 A1 Dec. 28, 2006

(30) Foreign Application Priority Data

Jun. 9, 2005 (JP) ................................. 2005-169506

(51) Int. Cl.
*G03B 17/00* (2006.01)
(52) U.S. Cl. ........................................ 396/50; 348/231.3
(58) Field of Classification Search .................... 396/50, 396/52; 348/231.3, 333.1; 386/117; 116/213
See application file for complete search history.

(56) References Cited

U.S. PATENT DOCUMENTS

| 6,408,301 | B1* | 6/2002 | Patton et al. ................... 707/102 |
| 7,748,022 | B1* | 6/2010 | Frazier ........................ 348/231.3 |
| 2002/0070940 | A1* | 6/2002 | Hampl et al. .................. 345/473 |

FOREIGN PATENT DOCUMENTS

JP 2005-286377 10/2005

\* cited by examiner

*Primary Examiner* — Clayton E Laballe
*Assistant Examiner* — Autumn Parker
(74) *Attorney, Agent, or Firm* — Oblon, Spivak, McClelland, Maier & Neustadt, L.L.P.

(57) ABSTRACT

An information processing device includes a processing unit that recognizes an action based on sensor data output by a sensor and obtained in a same timing as a photographing timing of an image string. The processing unit associates information indicating the action as information for a selection of a reproduction position at a time of a reproduction of the image string with the image string. In addition, the processing unit extracts a plurality of features from the sensor data. The processing unit recognizes the action based on a time series of the plurality of features using a model for a recognition.

12 Claims, 28 Drawing Sheets

WALK

RUN

STANDING STILL

RIGHT TURN

LEFT TURN

F I G . 2 7
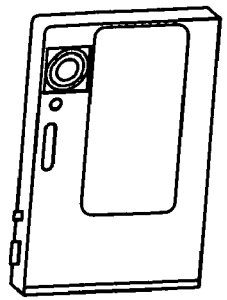
DIGITAL CAMERA
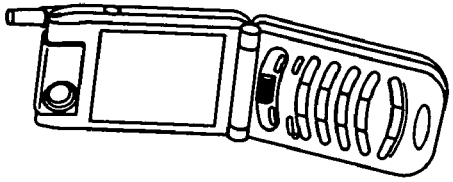
PORTABLE TELEPHONE WITH CAMERA
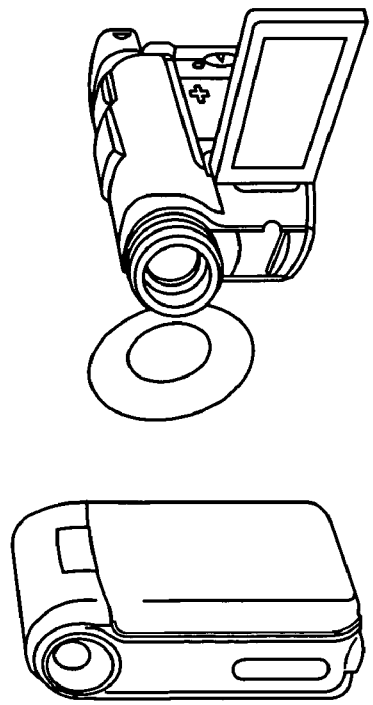
CAMCORDER
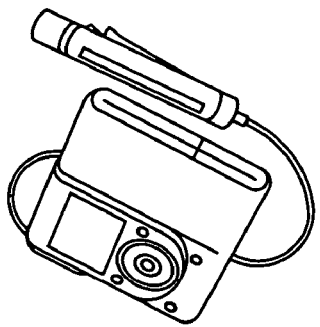
MUSIC PLAYER WITH CAMERA
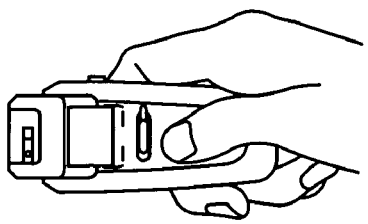
IC RECORDER WITH CAMERA FIG.28
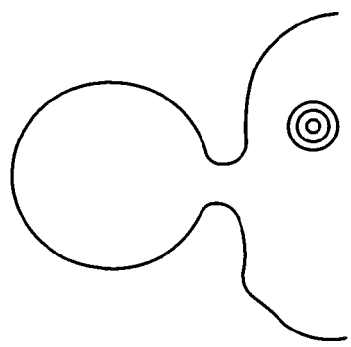
WEARABLE BADGE
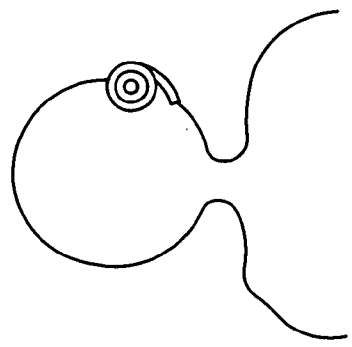
HEADPHONE TYPE
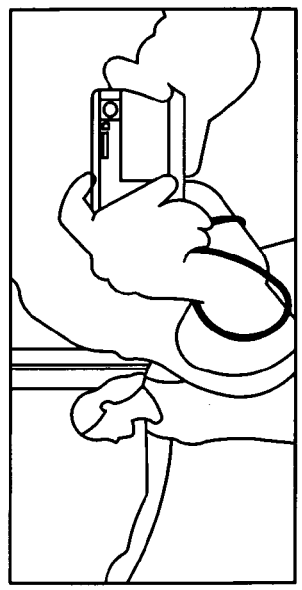
DIGITAL CAMERA PHOTOGRAPHING STYLE
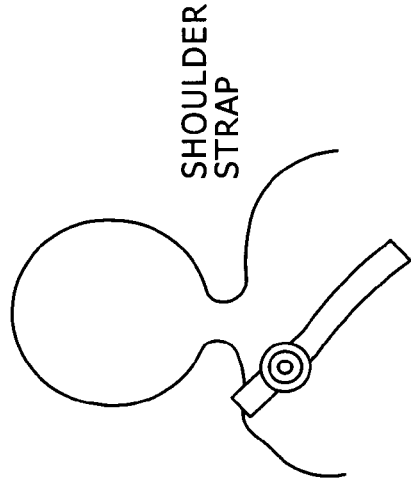
SHOULDER STRAP
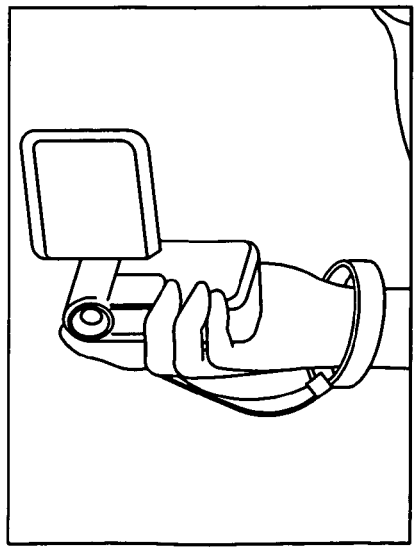
GUN GRIP STYLE
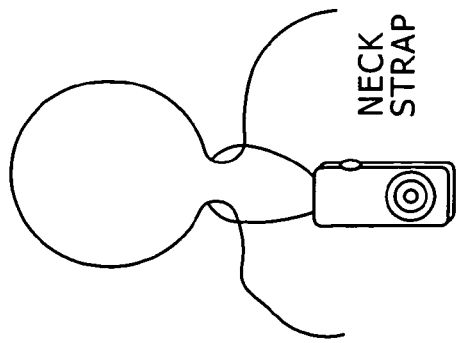
NECK STRAP

INFORMATION PROCESSING DEVICE AND METHOD, PHOTOGRAPHING DEVICE, AND PROGRAM

CROSS REFERENCES TO RELATED APPLICATIONS

The present invention contains subject matter related to Japanese Patent Application JP 2005-169506 filed in the Japanese Patent Office on Jun. 9, 2005, the entire contents of which being incorporated herein by reference.

BACKGROUND OF THE INVENTION

1. Field of the Invention

The present invention relates to a device and a method for information processing, a photographing device, and a program, and particularly to a device and a method for information processing, a photographing device, and a program that enable each scene of a photographed moving image to be handled in association with the action of a photographer, a subject or the like when the moving image is photographed.

2. Description of the Related Art

Video cameras have recently been coming into increasingly wide use because of decrease in price of the products. In addition, partly because of decrease in casing size, photographing of moving images is performed commonly and casually. Moving images are also photographed casually by a moving image photographing function incorporated in portable telephones and digital still cameras, for example.

While the photographing itself of moving images has thus become easier to perform, moving images after photographing are difficult to handle. To solve the problem, various techniques are proposed which add various kinds of attribute information to photographed moving images.

For example, Japanese Patent Laid-Open No. 2004-62868 discloses a technique that records the name of a person as a subject as metadata of a photographed image.

In addition, some video cameras for business use add attribute information such as weather, a position, and a sound volume at a time of photographing and a representative image of a clip (moving image for one photographing period from a photographing start to a photographing end) to each scene so that operation at a time of program editing can be performed easily.

SUMMARY OF THE INVENTION

However, even when metadata is added for handling after photographing, it is difficult for an ordinary user to search for a scene using various kinds of metadata. It can therefore be said that handling after photographing of moving images is still troublesome in general.

For example, in searching all of moving images taken by a video camera in related art of a DV (Digital Video) system for a predetermined scene, a user needs to fast-forward a tape or skip to reproduction positions in order at predetermined intervals.

Scenes that the user desires to view are generally limited to specific scenes of all scenes recorded on the DV tape. However, it is not possible to extract and reproduce only such specific scenes. The user has therefore to view unnecessary scenes reproduced in time series, and thus often gets bored. When there is a moving image obtained by photographing an athletic meet for children, a child and a parent, for example, viewing the moving image want to view only a specific scene such as a scene of the child running or the like.

It is conceivable that a device capturing images taken by a video camera or the like analyzes the contents of the taken images frame by frame, clusters similar scenes, and allows a user to select a scene to be reproduced in a unit of clustered scenes. However, it is difficult to cluster such similar scenes with high accuracy.

The present invention has been made in view of such a situation. It is desirable to enable each scene of a photographed moving image to be handled in association with the action of a photographer, a subject or the like when the moving image is photographed, and to enable for example a user to specify an action and select a scene to be reproduced.

An information processing device, an information processing method, and a program according to a first embodiment of the present invention includes an associating section/step for recognizing action of a person having a device including a sensor that outputs sensor data obtained in same timing as photographing timing of an image string on a basis of the sensor data, and associating information indicating the recognized action as information to be used for selection of a reproduction position at a time of reproduction of the image string with the image string.

In the information processing device, the information processing method, and the program, action of a person having a device including a sensor that outputs sensor data obtained in same timing as photographing timing of an image string is recognized on a basis of the sensor data, and information indicating the recognized action is associated with the image string as information to be used for selection of a reproduction position at a time of reproduction of the image string.

A photographing device according to a second embodiment of the present invention includes: a photographing section; and an associating section for recognizing action of a person having a device including a sensor that outputs sensor data obtained in same timing as timing of photographing of an image string by the photographing section on a basis of the sensor data, and associating information indicating the recognized action as information to be used for selection of a reproduction position at a time of reproduction of the image string with the image string.

In the photographing device, photographing is performed, action of a person having a device including a sensor that outputs sensor data obtained in same timing as timing of the photographing is recognized on a basis of the sensor data, and information indicating the recognized action is associated with the image string as information to be used for selection of a reproduction position at a time of reproduction of the image string.

According to the present invention, each scene of a photographed moving image can be handled in association with the action of a photographer, a subject or the like when the moving image is photographed.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 27 is a diagram showing an example of devices;

FIG. 28 is a diagram showing an example of photographing styles; and

DETAILED DESCRIPTION OF THE PREFERRED EMBODIMENTS

Figure 1:
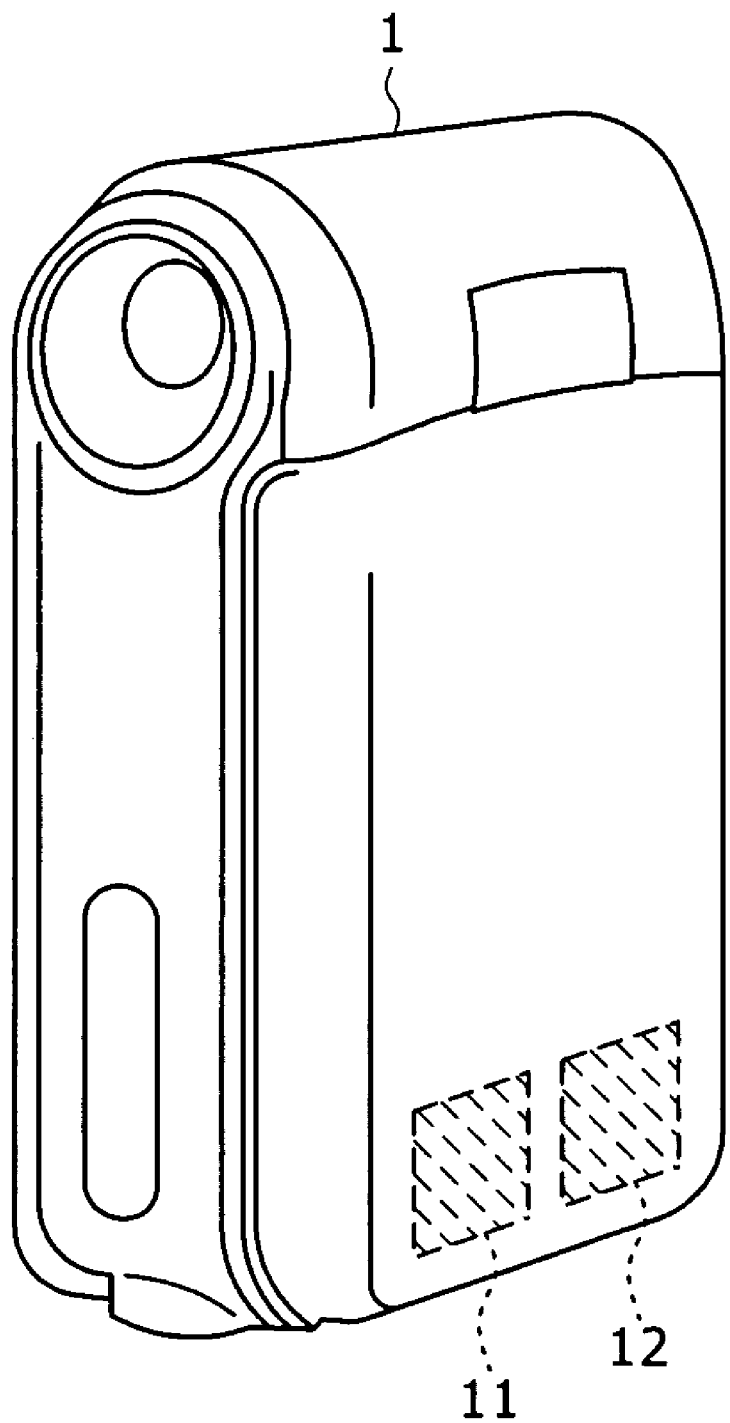
FIG. 1 is a diagram showing an example of an external appearance of a camcorder according to an embodiment of the present invention.

Preferred embodiments of the present invention will hereinafter be described. Correspondences between inventions described in the present specification and embodiments of the inventions are illustrated as follows. This description is to confirm that embodiments supporting the inventions described in claims are described in the present specification. Therefore, even when there is an embodiment described in the embodiments of the inventions but not described here as corresponding to an invention, it does not signify that the embodiment does not correspond to that invention. Conversely, even when an embodiment is described here as corresponding to an invention, it does not signify that the embodiment does not correspond to inventions other than that invention.

Further, this description does not represent all the inventions described in the present specification. In other words, this description does not negate presence of inventions described in the present specification but not claimed in the present application, that is, presence of inventions to be claimed in a divisional application or to be added by amendments in the future.

According to an embodiment of the present invention, an information processing device includes associating means (for example an action recognizing unit 71 in FIG. 5, FIG. 20, or FIG. 21) for recognizing action of a person having a device (for example a camcorder 1 in FIG. 1 or a sensor badge 102 in FIG. 18) including a sensor that outputs sensor data (for example acceleration sensor data and gyro sensor data) obtained in same timing as photographing timing of an image string on a basis of the sensor data, and associating information indicating the recognized action as information to be used for selection of a reproduction position at a time of reproduction of the image string with the image string.

The information processing device further includes reproduction controlling means (for example a reproduction controlling unit 92 in FIG. 10) for reproducing a scene of the entire image string, the scene being associated with an action selected by a user from among a plurality of actions recognizable by the associating means.

The information processing device further includes display controlling means (for example a player screen display controlling unit 91 in FIG. 10) for displaying distributions of scenes associated with respective actions by action type.

When the sensor is included in a device having a casing different from a casing of the information processing device, the information processing device further includes communicating means (for example a wireless LAN module 111 in FIG. 18) for performing radio communication with the device, and obtaining the sensor data.

The information processing device further includes: image processing means (for example a clustering unit 151 in FIG. 24) for clustering images forming the image string according to contents of the images; and action correcting means (for example a noise removing unit 161 in FIG. 25) for associating one of actions associated by the associating means with images whose contents are determined to be similar to each other with one entire scene formed by the images whose contents are determined to be similar to each other on a basis of a result of processing by the image processing means.

According to an embodiment of the present invention, an information processing method includes an associating step (for example step S23 in FIG. 13) of recognizing action of a person having a device (for example a camcorder 1 in FIG. 1 or a sensor badge 102 in FIG. 18) including a sensor that outputs sensor data (for example acceleration sensor data and gyro sensor data) obtained in same timing as photographing timing of an image string on a basis of the sensor data, and associating information indicating the recognized action as information to be used for selection of a reproduction position at a time of reproduction of the image string with the image string.

In a program according to an embodiment of the present invention, an embodiment (one example) to which each step corresponds is the same as in the information processing method according to the foregoing embodiment of the present invention.

According to an embodiment of the present invention, a photographing device includes: photographing means (for example a camera unit 51 in FIG. 4); and associating means (for example an action recognizing unit 71 in FIG. 5 or FIG. 21) for recognizing action of a person having a device (for example a camcorder 1 in FIG. 1 or a sensor badge 102 in FIG. 18) including a sensor that outputs sensor data (for example acceleration sensor data and gyro sensor data) obtained in same timing as timing of photographing of an image string by the photographing means on a basis of the sensor data, and associating information indicating the recognized action as information to be used for selection of a reproduction position at a time of reproduction of the image string with the image string.

Preferred embodiments of the present invention will hereinafter be described with reference to the drawings.

FIG. 1 is a diagram showing an example of an external appearance of a camcorder 1 according to an embodiment of the present invention.

The camcorder 1 has a function of collecting sound and photographing images, and recording obtained audio data and video data on a predetermined recording medium such as an HDD (Hard Disk Drive) or the like. In addition, the camcorder 1 has a function of recognizing the action of a user as a photographer holding the camcorder 1 on the basis of sensor data obtained by a built-in sensor in the same timing as that of the photographing and the like (sound collection and photographing), and recording the recognized action of the user in association with the photographed images.

For example, the camcorder 1 includes an acceleration sensor 11 and a gyro sensor 12 as shown by dotted lines in FIG. 1. The action of the user is recognized on the basis of acceleration sensor data resulting from measurement by the acceleration sensor 11 and gyro sensor data resulting from measurement by the gyro sensor 12. The recognized action (information indicating the action) is for example used for selection of a reproduction position at a time of reproduction of an image obtained by photographing.

Figure 2:
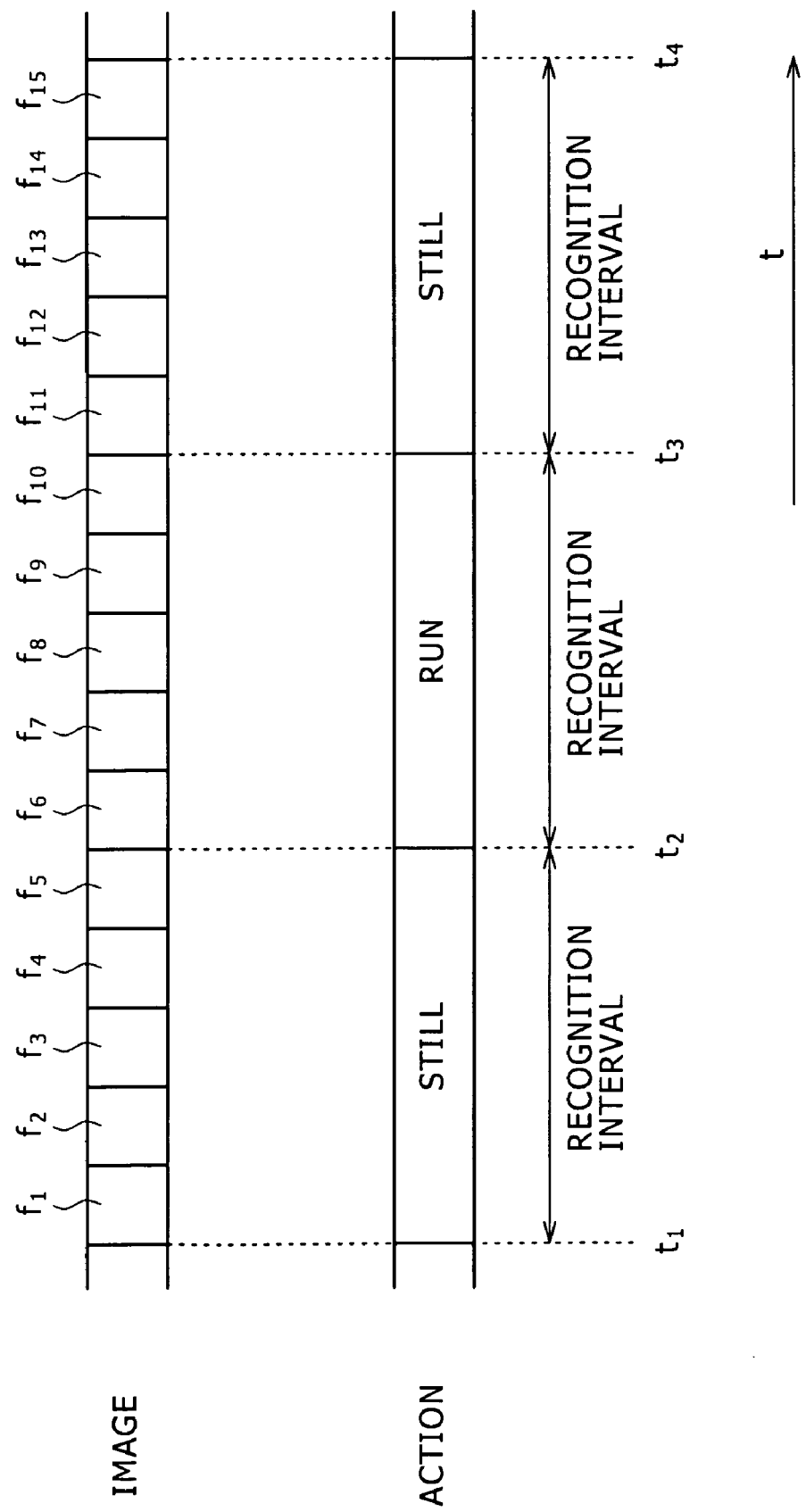
FIG. 2 is a diagram showing an example of associating photographed images with actions as results of recognition.

FIG. 2 is a diagram showing an example of associating photographed images with actions as results of recognition.

The camcorder 1 obtains one result of recognition of the action of the user on the basis of sensor data of a predetermined number of samples obtained by the acceleration sensor 11 and the gyro sensor 12 in a predetermined time unit. In the example of FIG. 2, on the basis of sensor data obtained by the acceleration sensor 11 and the gyro sensor 12 during one recognition interval from time $t_1$ to time $t_2$, "standing still" is recognized as the action of the user during the interval.

Photographing and the like are also performed as described above during the period from time $t_1$ to time $t_2$. In the example of FIG. 2, "standing still" as a result of recognition for the interval from time $t_1$ to time $t_2$ is associated with frames $f_1$ to $f_5$ taken during the period from time $t_1$ to time $t_2$.

Similarly, "run" as a result of recognition of the action of the user which action is recognized for one recognition interval from time $t_2$ to time $t_3$ is associated with frames $f_6$ to $f_{10}$ taken during the period from time $t_2$ to time $t_3$. "Standing still" as a result of recognition of the action of the user which action is recognized for one recognition interval from time $t_3$ to time $t_4$ is associated with frames $f_{11}$ to $f_{15}$ taken during the period from time $t_3$ to time $t_4$. Information indicating the results of recognition for the respective intervals is recorded on a built-in recording medium, for example, together with the data of the taken images and collected sound.

Thus, the camcorder 1 records a photographed image and a result of action recognition in synchronism with each other.

At a time of reproduction of photographed images, the user selects a predetermined action from among a plurality of actions recognizable by the camcorder 1, so that digest reproduction of only scenes associated with the selected action among all of photographed images can be performed. For example, in the case of the photographed images shown in FIG. 2, the user selects "standing still", so that reproduction of the frames $f_1$ to $f_5$ associated with "standing still" followed by reproduction of the frames $f_{11}$ to $f_{15}$ can be performed (of course, sound collected at the times of taking the frames $f_1$ to $f_5$ and the frames $f_{11}$ to $f_{15}$ is also reproduced). That is, the user does not have to view the frames $f_6$ to $f_{10}$ as a scene associated with "run", which is not the action selected by the user.

Figure 3:
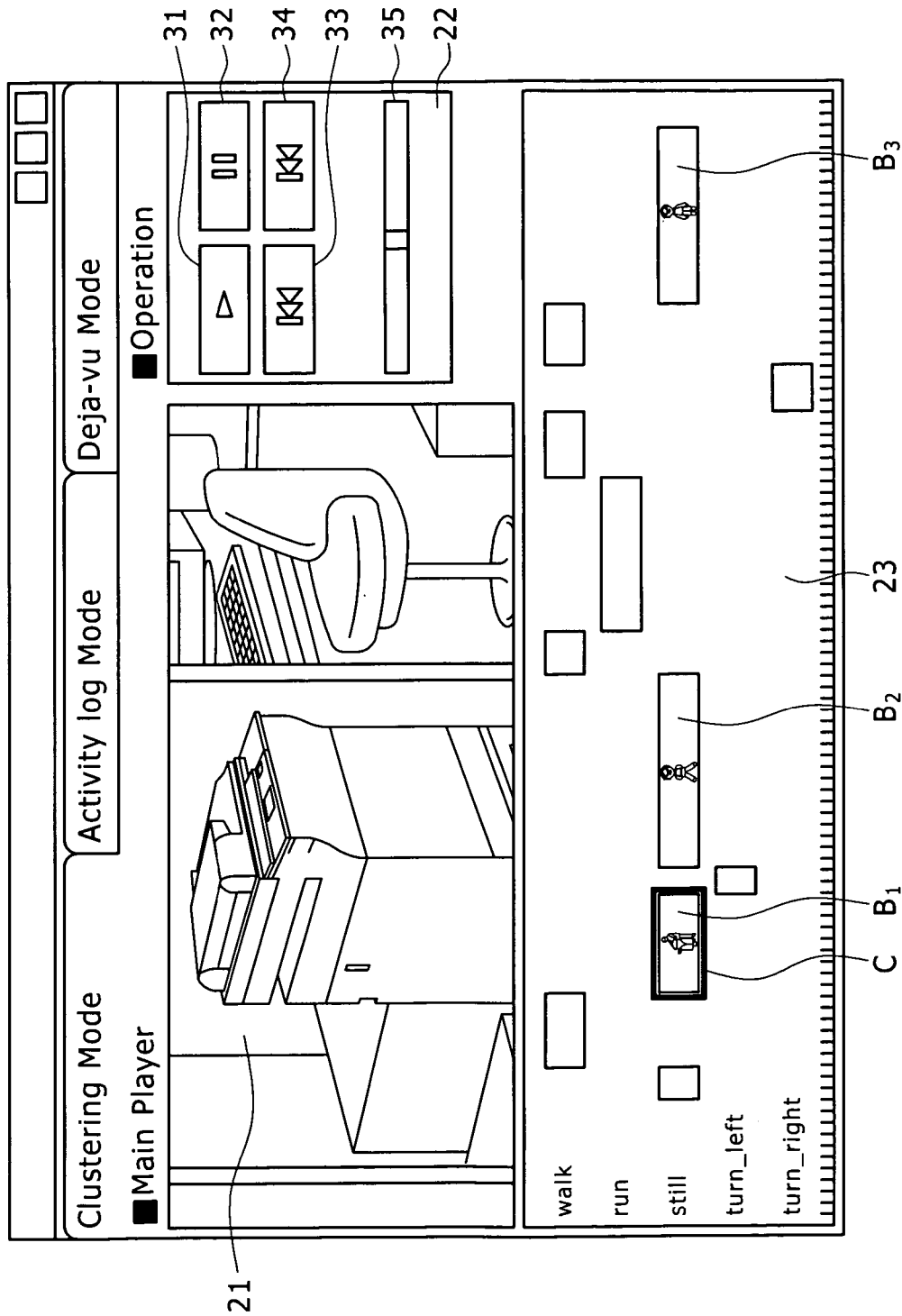
FIG. 3 is a diagram showing an example of display of a player screen.

FIG. 3 is a diagram showing an example of a player screen that allows a predetermined action to be thus selected so that only scenes associated with the action are viewed.

The player screen may for example be displayed by the camcorder 1 after the user connects the camcorder 1 to a television receiver and operates the camcorder 1, or may be displayed by a personal computer that captures video and audio data and information on action associated with the video and audio data from the camcorder 1, as will be described later.

The player screen basically includes: an image displaying part 21 for displaying a scene being reproduced; an operating panel 22 where various operating buttons are displayed; and a block displaying part 23 for displaying distributions of scenes associated with respective actions by action type.

Of these parts, in the block displaying part 23, the distributions of the scenes associated with the respective actions are represented by blocks at positions corresponding to photographing times with a lateral direction as a time base. In the example of FIG. 3, a block including a scene now being reproduced is a block $B_1$, and a cursor C is displayed on the block $B_1$. That is, in the example of FIG. 3, the user has selected "standing still" from five actions "walk (walk)", "run (run)", "standing still (still)", "left turn (turn_left)", and "right turn (turn_right)", which are actions recognizable by the camcorder 1.

When reproduction of all scenes included in the block $B_1$ is ended, a reproduction position skips to a start position of a block $B_2$ associated with the same action "standing still", and reproduction of a scene included in the block $B_2$ is started. When the reproduction position skips to the start position of the block $B_2$, the cursor C moves from the block $B_1$ to the block $B_2$.

Incidentally, displayed on the operating panel 22 are a reproduction button 31 operated when an instruction to start reproduction is given, a stop button 32 operated when an instruction to stop reproduction is given, a return button 33 operated when a block to be reproduced (a block including a scene to be reproduced) is changed to a temporally immediately preceding block associated with the same action as that of the block now being reproduced, an advance button 34 operated when the block to be reproduced is changed to a temporally immediately succeeding block associated with the same action as that of the block now being reproduced, and a scroll bar 35.

The user can change the block being produced by operating the return button 33 or the advance button 34, and thus search for a predetermined scene.

Thus, scenes are classified by action at the time of photographing, and blocks to be reproduced can be selected for each action. When the user desires to view a "scene of eating delicious buckwheat noodles", for example, of all photographed images, the user can find only such a predetermined scene among all the photographed images by selecting "standing still" on the player screen of FIG. 3 and changing a block being reproduced, for example.

Generally, "standing still" is recognized as the action of the user as photographer for a scene taken when buckwheat noodles are eaten on the basis of outputs from the acceleration sensor 11 and the gyro sensor 12, and the action is associated with the scene. Therefore, by selecting "standing still", the user can narrow down scenes by action, and easily find the "scene of eating delicious buckwheat noodles".

When the user desires to view a "scene of all of my family strolling together in a town during a family trip", for example, the user can find only such a predetermined scene among all the photographed images by selecting "walk" on the player screen of FIG. 3 and changing a block being reproduced, for example.

Generally, "walk" is recognized as the action of the user as photographer for a scene taken when the user is walking on the basis of outputs from the acceleration sensor 11 and the gyro sensor 12, and the action is associated with the scene. Therefore, by selecting "walk", the user can narrow down scenes by action, and easily find the "scene of all of my family strolling together in a town during a family trip".

When the user desires to view a "scene of making a turn on skis", for example, the user can find only such a predetermined scene among all the photographed images by selecting "right turn" or "left turn" on the player screen of FIG. 3 and changing a block being reproduced, for example.

Generally, "right turn" or "left turn" is recognized as the action of the user as photographer for a scene taken when the user is making a turn on skis on the basis of outputs from the acceleration sensor 11 and the gyro sensor 12, and the action is associated with the scene. Therefore, by selecting "right turn" or "left turn", the user can narrow down scenes by action, and easily find the "scene of making a turn on skis".

An operation of the camcorder 1 for making screen display and the like as described above will be described later with reference to flowcharts.

Figure 4:
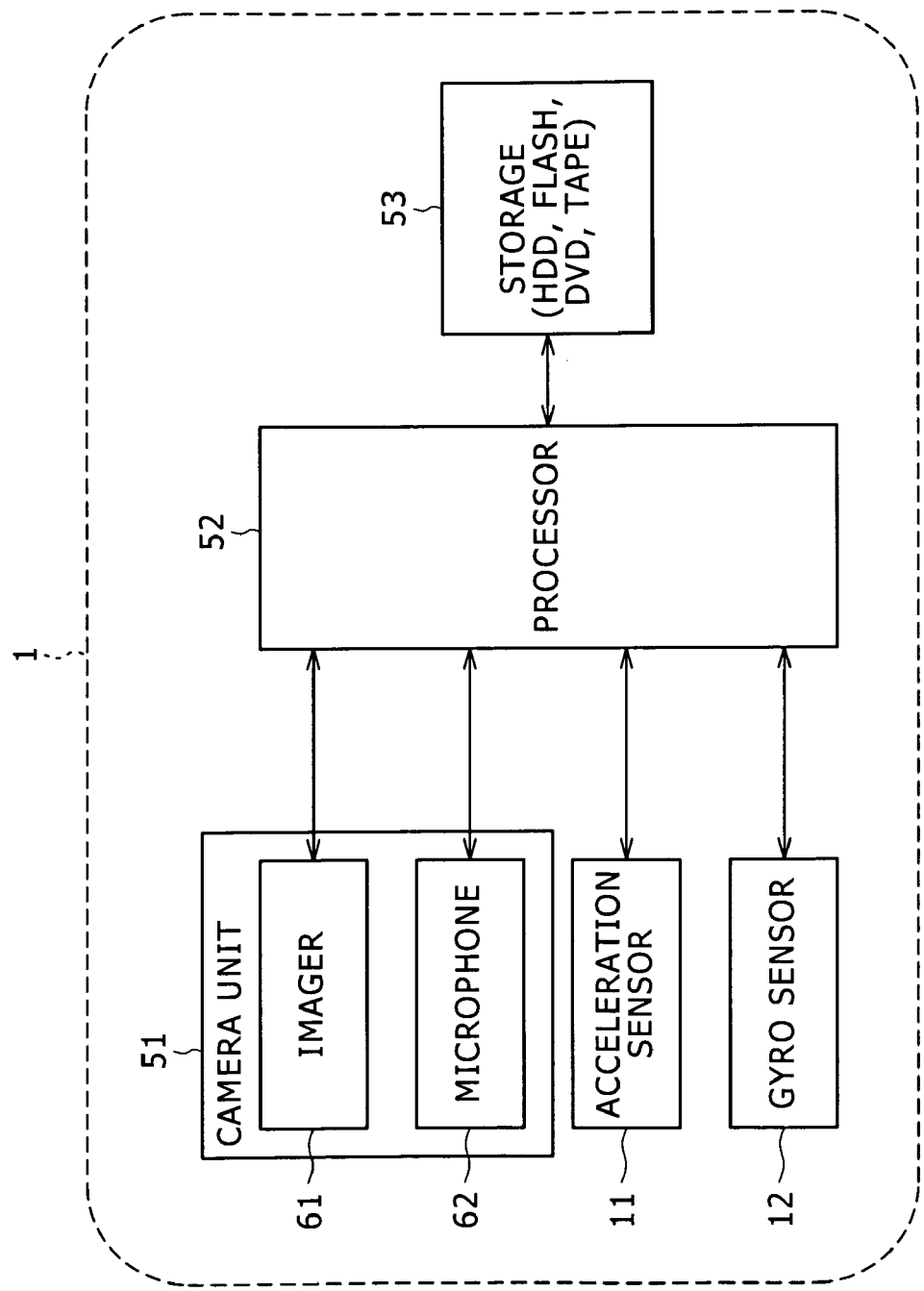
FIG. 4 is a block diagram showing an example of hardware configuration of the camcorder.

FIG. 4 is a block diagram showing an example of hardware configuration of the camcorder 1.

A camera unit 51 includes an imager 61 and a microphone 62. The imager 61 outputs image data of an image of a subject taken via a lens to a processor 52. The microphone 62 outputs data of collected sound to the processor 52.

The acceleration sensor 11 measures acceleration in predetermined cycles, and outputs acceleration sensor data as a result of the measurement to the processor 52. The acceleration sensor 11 can measure acceleration in directions of three axes orthogonal to each other, for example.

The gyro sensor 12 measures angular velocity in predetermined cycles, and outputs gyro sensor data as a result of the measurement to the processor 52. The gyro sensor 12 can measure angular velocity about the three axes orthogonal to each other, for example.

The processor 52 controls the operation of the whole of the camcorder 1. The processor 52 makes the acceleration sensor 11 measure acceleration and makes the gyro sensor 12 measure angular velocity in the same timing as that of photographing by the imager 61 and sound collection by the microphone 62.

Also, the processor 52 records the image data supplied from the imager 61 and the audio data supplied from the microphone 62 in a storage 53. In addition, the processor 52 recognizes the action of the user on the basis of the outputs from the acceleration sensor 11 and the gyro sensor 12, and records a result of the recognition in the storage 53. Incidentally, rather than performing such action recognition immediately after the sensor data is supplied from the acceleration sensor 11 and the gyro sensor 12, the sensor data supplied from the acceleration sensor 11 and the gyro sensor 12 may be temporarily recorded in the storage 53, and the action recognition using the recorded sensor data may be performed in predetermined timing.

Further, the processor 52 reads various data recorded in the storage 53 as occasion arises to display the player screen of FIG. 3 on the television receiver (display) or the like connected to the camcorder 1.

The storage 53 is formed by a flash memory or a drive such as an HDD, a DVD (Digital Versatile Disk) drive, a tape drive or the like. The storage 53 records therein data supplied from the processor 52.

Figure 5:
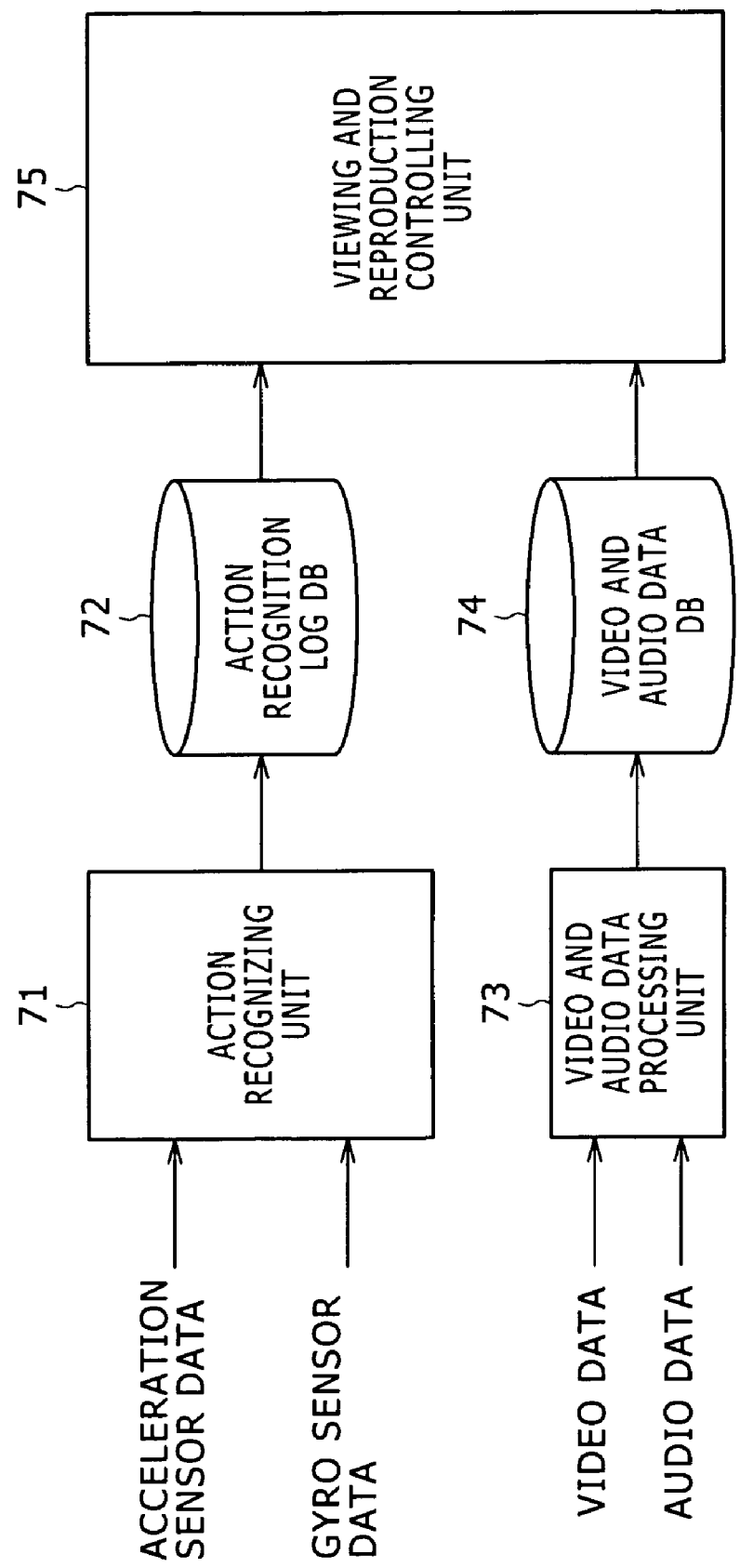
FIG. 5 is a block diagram showing an example of software configuration of the camcorder.

FIG. 5 is a block diagram showing an example of software configuration (an example of functional configuration) of the camcorder 1. At least a part of functional units shown in FIG. 5 are implemented by the processor 52 in FIG. 4 executing a predetermined program.

As will be described later in detail, an action recognizing unit 71 extracts features from the acceleration sensor data supplied from the acceleration sensor 11 and the gyro sensor data supplied from the gyro sensor 12, and recognizes the action of the user in each interval on the basis of a time series of the extracted features referring to an HMM (Hidden Markov Model) prepared in advance. The action recognizing unit 71 outputs information indicating a result of the recognition in each interval to an action recognition log DB 72 to record the information in the action recognition log DB 72.

A video and audio data processing unit 73 compresses the video data supplied from the imager 61 by a predetermined system. The video and audio data processing unit 73 outputs data obtained by compressing the video data to a video and audio data DB 74 to record the data in the video and audio data DB 74. Similarly, the video and audio data processing unit 73 compresses the audio data supplied from the microphone 62 by a predetermined system. The video and audio data processing unit 73 outputs data obtained by compressing the audio data to the video and audio data DB 74 to record the data in the video and audio data DB 74.

A viewing and reproduction controlling unit 75 reads the action recognition result recorded in the action recognition log DB 72 and the video data and the audio data recorded in the video and audio data DB 74, and controls display of the player screen of FIG. 3 and reproduction of video data and audio data according to an operation by the user on the screen.

Figure 6:
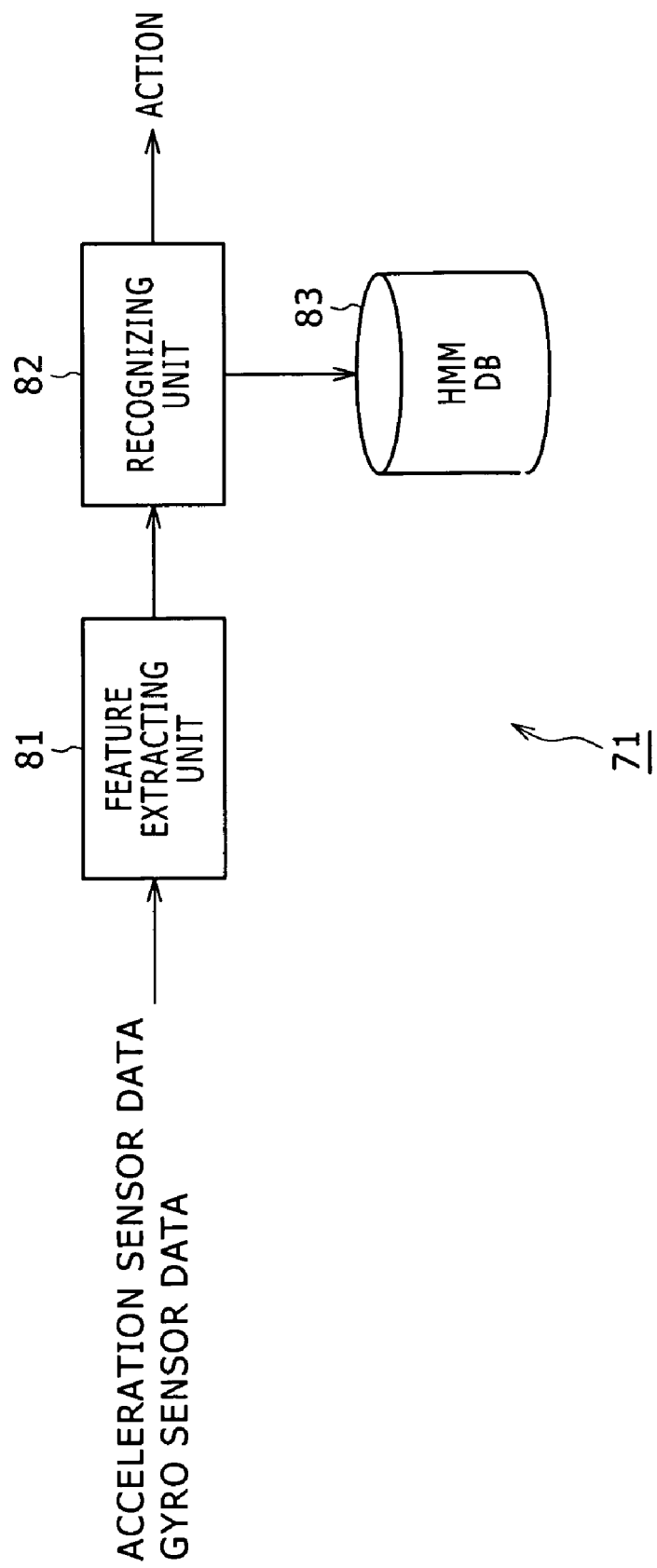
FIG. 6 is a block diagram showing an example of detailed configuration of an action recognizing unit in FIG. 5.

FIG. 6 is a block diagram showing an example of detailed configuration of the action recognizing unit 71 in FIG. 5.

The action recognizing unit 71 includes a feature extracting unit 81, a recognizing unit 82, and an HMM DB 83. Of these parts, the feature extracting unit 81 extracts features from acceleration sensor data supplied from the acceleration sensor 11 and gyro sensor data supplied from the gyro sensor 12. The feature extracting unit 81 outputs feature data indicating the extracted features to the recognizing unit 82.

Figure 7A:
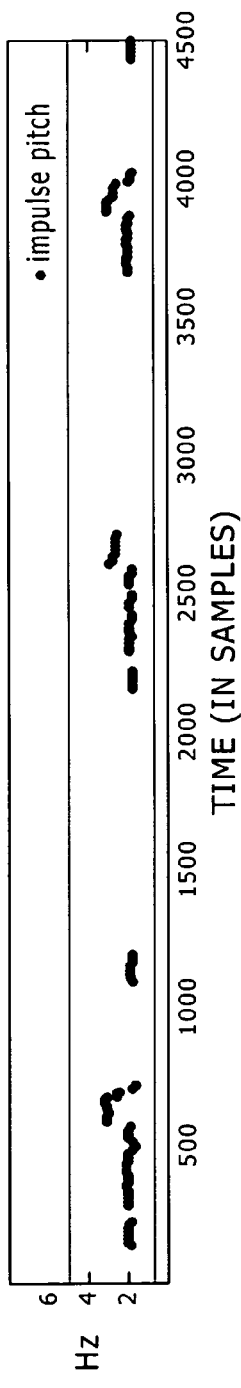
FIGS. 7A, 7B, and 7C are diagrams showing an example of feature data.

Specifically, as shown in FIG. 7A, the feature extracting unit 81 obtains a walk frequency (impulse pitch) as one feature from the acceleration sensor data. In a sample result of FIG. 7A, an axis of abscissas represents time (number of samples of the acceleration sensor 11), and an axis of ordinates represents frequency (Hz). The frequency measured by the acceleration sensor when a person walks is generally 2 Hz (two steps per second). Thus, a "walk" as a result of recognition is obtained from a time series of results of the measurement of 2 Hz or the like, referring to an HMM.

Figure 7B:
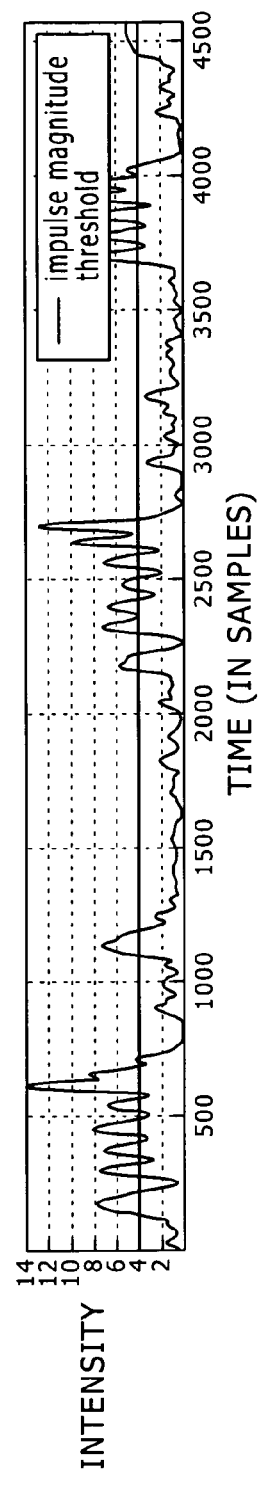

In addition, as shown in FIG. 7B, the feature extracting unit 81 obtains a walk intensity, or an impulse magnitude as one feature from the acceleration sensor data. In a sample result of FIG. 7B, an axis of abscissas represents time, and an axis of ordinates represents intensity.

Figure 7C:
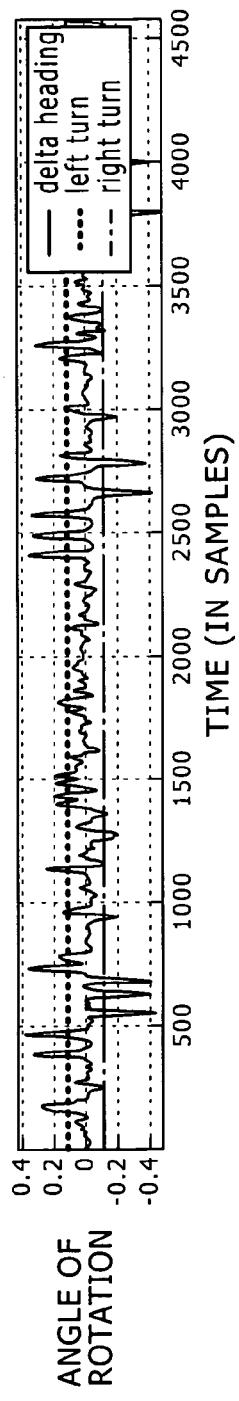

Further, as shown in FIG. 7C, the feature extracting unit 81 obtains a gravity axis from the acceleration sensor data, and obtains, as one feature, an angle of rotation (heading) about the gravity axis which angle of rotation is obtained from the gyro sensor data. The output is zero when the acceleration sensor detects an acceleration in a horizontal direction with respect to the gravity axis, whereas a predetermined value is measured when the acceleration sensor detects an acceleration in a direction other than the horizontal direction with respect to the gravity axis. Thus, when acceleration in the three axial directions can be measured, as described above, the gravity axis can be obtained from a result of measurement of the acceleration in the directions. Incidentally, in a sample result of FIG. 7C, an axis of abscissas represents time, and an axis of ordinates represents the angle of rotation.

For example, the feature extracting unit 81 extracts the various features as described above on the basis of the sensor data (acceleration sensor data and gyro sensor data). The feature data indicating the extracted features is output to the recognizing unit 82 sequentially each time a feature is extracted.

The recognizing unit 82 accumulates a predetermined amount of the feature data supplied from the feature extracting unit 81, and recognizes the action of the user photographing holding the camcorder 1 on the basis of a time series of the accumulated feature data, referring to the HMM provided in the HMM DB 83.

The HMM DB 83 is provided in advance with for example a model used to recognize a "walk" which model is created on the basis of features extracted from acceleration sensor data and gyro sensor data when a person is walking, and a model used to recognize a "run" which model is created on the basis of features extracted from acceleration sensor data and gyro sensor data when a person is running. The HMM DB 83 is further provided in advance with for example a model used to recognize "standing still" which model is created on the basis of features extracted from acceleration sensor data and gyro sensor data when a person is standing still, a model used to recognize "left turn" which model is created on the basis of features extracted from acceleration sensor data and gyro sensor data when a person is making a left turn, and a model used to recognize "right turn" which model is created on the basis of features extracted from acceleration sensor data and gyro sensor data when a person is making a right turn.

Information indicating a result of the recognition of each action such as "walk", "run", "standing still", "left turn", "right turn", or the like recognized by the recognizing unit 82 is output as a recognition result to the outside (action recognition log DB 72 in FIG. 5).

Figure 8:
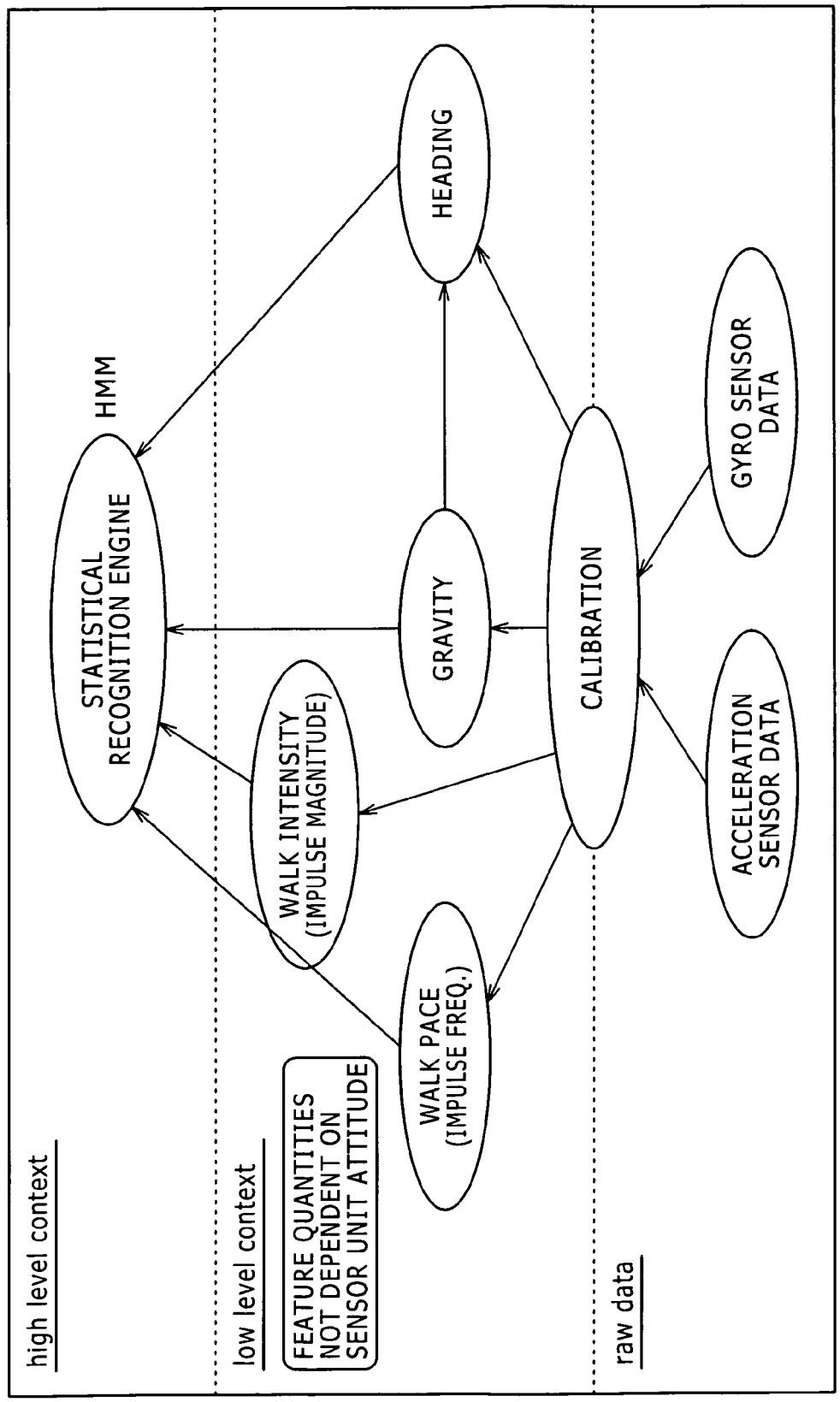
FIG. 8 is a diagram schematically showing action recognition.

FIG. 8 is a diagram schematically showing action recognition by the action recognizing unit 71.

Calibration is performed on acceleration sensor data and gyro sensor data as raw data. A walk pace, a walk intensity, gravity, and a heading direction as described above are obtained as feature quantities (low level context) from data resulting from the calibration. The HMM is referred to on the basis of the obtained feature quantities, and the action of the user (high level context) is statistically recognized.

It is to be noted that an action recognition algorithm is not limited to the above-described algorithm, and the action recognition may be performed by various algorithms.

Figure 9:
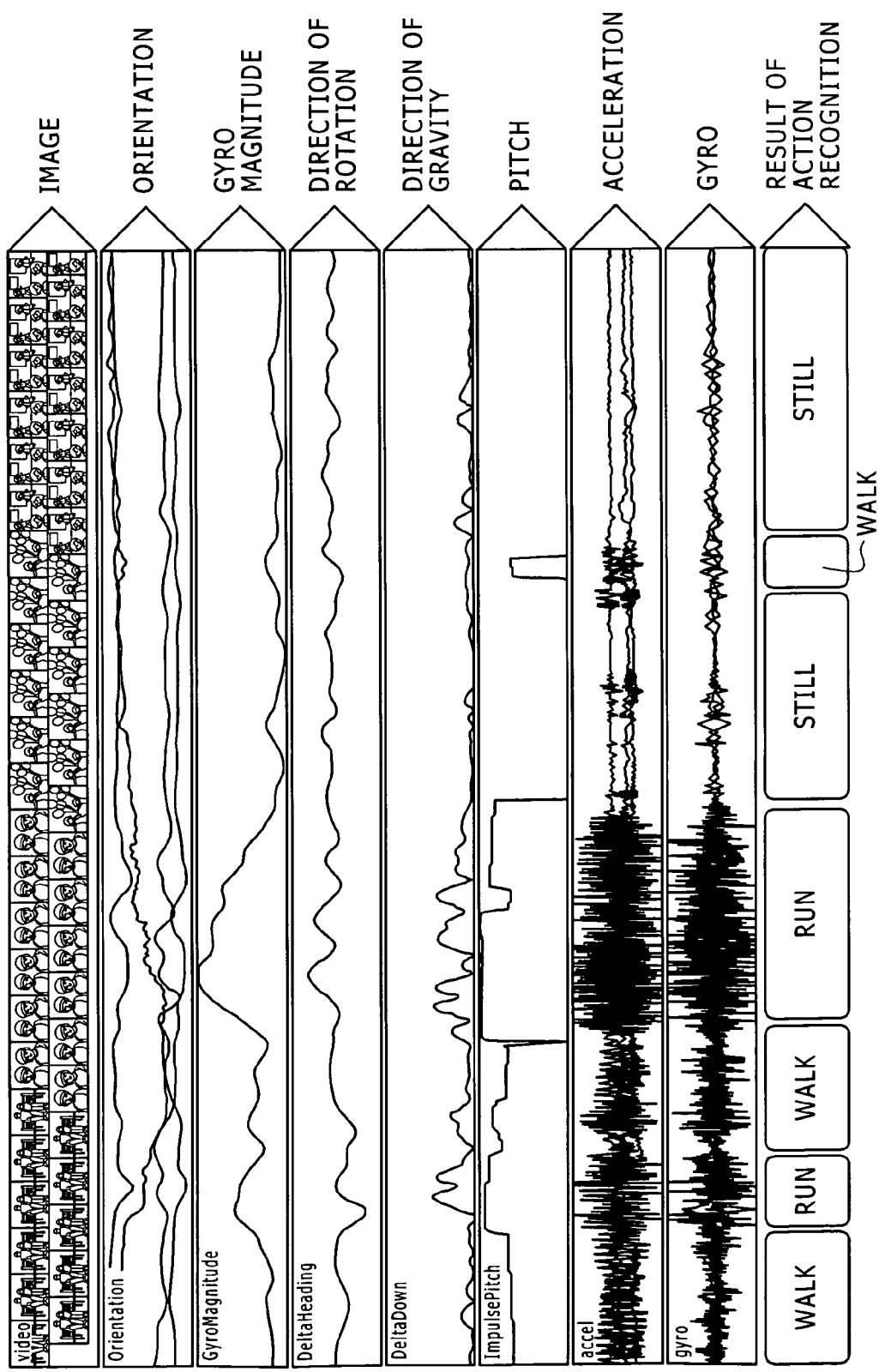
FIG. 9 is a diagram showing an example of images, sensor data, feature quantities, and a result of recognition in time series.

FIG. 9 is a diagram showing an example of photographed images, sensor data, feature quantities, and a result of recognition in time series.

In the example of FIG. 9, "walk", "run", "walk", "run", "standing still", "walk", and "standing still" are obtained in that order as a result of action recognition. Each such recognition result is associated with images photographed in a corresponding time, and information indicating action recognized in each interval, such as "walk" in a recognition interval from a start of photographing to a time seconds after the start of photographing, "run" in a next recognition interval, and the like, is recorded in the action recognition log DB 72.

Figure 10:
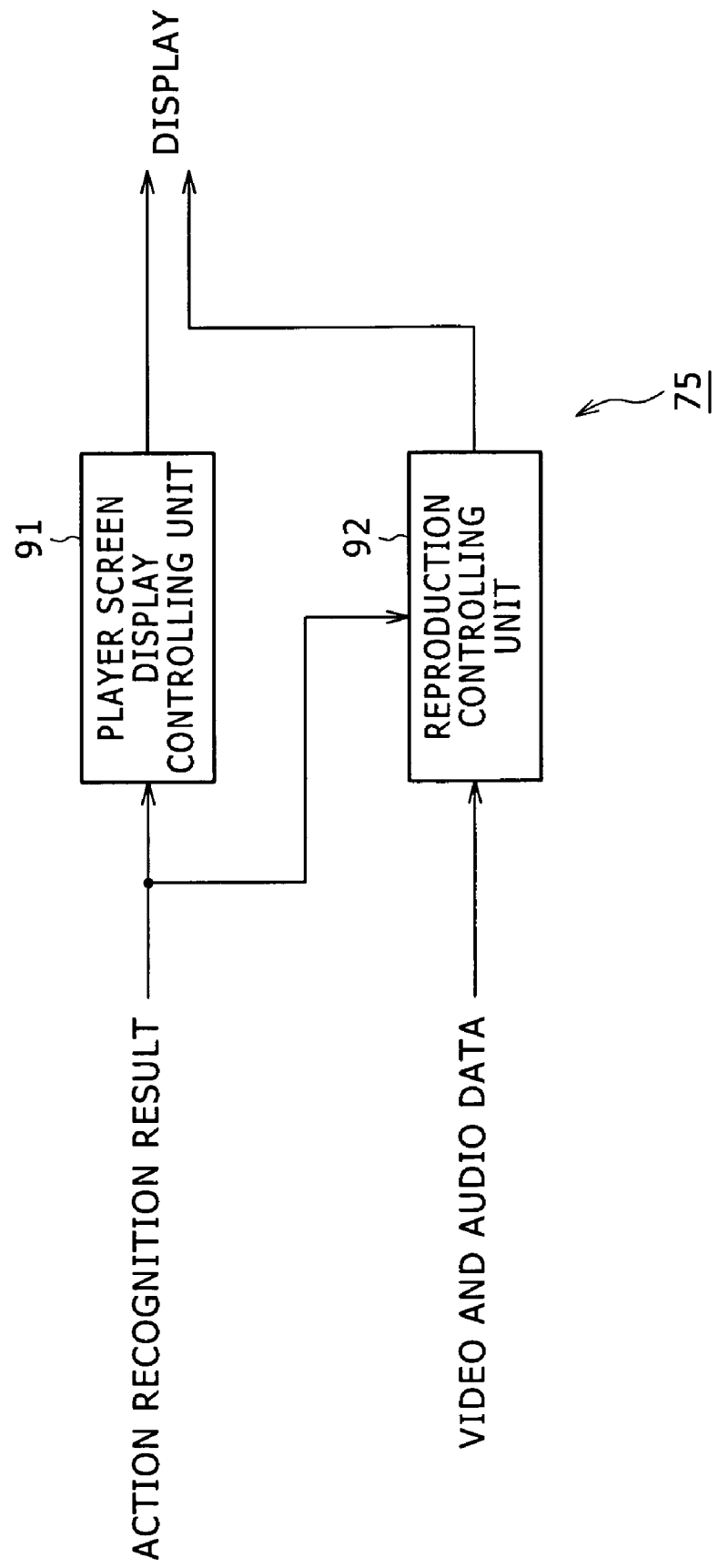
FIG. 10 is a block diagram showing an example of detailed configuration of a viewing and reproduction controlling unit in FIG. 5.

FIG. 10 is a block diagram showing an example of detailed configuration of the viewing and reproduction controlling unit 75 in FIG. 5.

The viewing and reproduction controlling unit 75 includes a player screen display controlling unit 91 and a reproduction controlling unit 92. Of these units, the player screen display controlling unit 91 displays the player screen of FIG. 3 when the camcorder 1 is connected to a television receiver and an instruction to display the player screen is given by the user, for example. In addition, the player screen display controlling unit 91 displays distributions of scenes associated with respective actions in the block displaying part 23 on the basis of action recognition results read from the action recognition log DB 72.

The reproduction controlling unit 92 reads action recognition results from the action recognition log DB 72. For example, when a predetermined action is selected by the user, the reproduction controlling unit 92 reads video data and audio data associated with the selected action from the video and audio data DB 74 to reproduce the video data and the audio data. A reproduced image is displayed in the image displaying part 21 of the player screen, and reproduced sound is output from a speaker not shown in the figure.

Operations of the camcorder 1 having the above-described configuration will next be described with reference to flowcharts.

Figure 11:
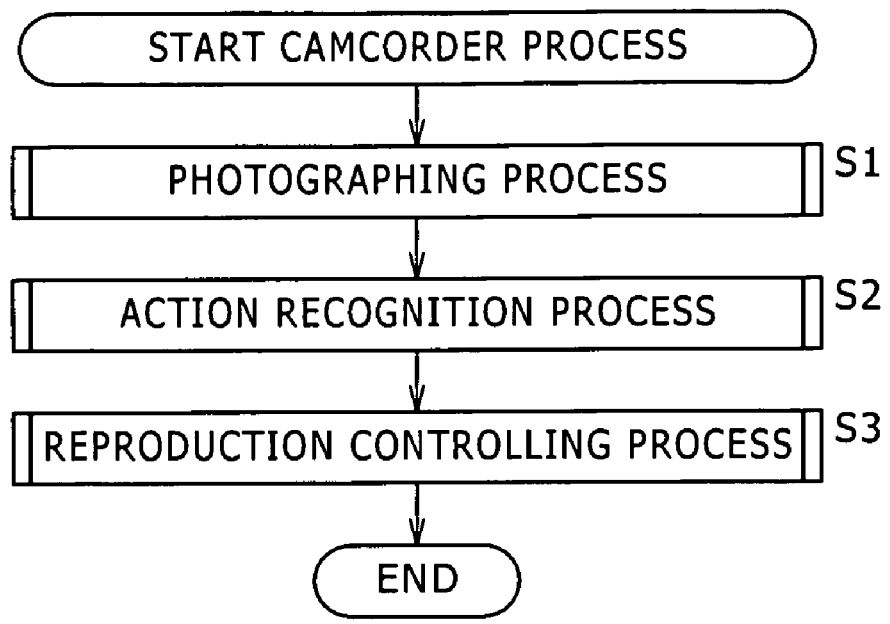
FIG. 11 is a flowchart of assistance in explaining a series of processes performed by the camcorder.

A series of processes performed by the camcorder 1 will first be described with reference to a flowchart of FIG. 11.

When an instruction to start photographing is given by the user, for example, a photographing process is performed in step S1. Details of the photographing process will be described later. This process makes the acceleration sensor 11 and the gyro sensor 12 measure acceleration and angular velocity, respectively, in synchronism with photographing and sound collection by the camera unit 51.

In step S2, an action recognition process based on acceleration sensor data obtained by the acceleration sensor 11 and gyro sensor data obtained by the gyro sensor 12 is performed. This action recognition process may for example be performed immediately after the sensor data is obtained by the acceleration sensor 11 and the gyro sensor 12, or when the sensor data obtained by the acceleration sensor 11 and the gyro sensor 12 is temporarily recorded in the storage 53 or the like, the action recognition process may be performed in predetermined timing on the basis of the recorded sensor data.

In step S3, a reproduction controlling process is performed. In this reproduction controlling process, the player screen of FIG. 3 is displayed on the basis of a recognition result obtained in step S2 and the like, and a digest reproduction or the like is performed in response to an operation by the user.

Details of the photographing process performed in step S1 in FIG. 11 will next be described with reference to a flowchart of FIG. 12.

In step S11, the processor 52 controls the camera unit 51 in response to an instruction from the user to make the camera unit 51 start photographing (photographing and sound collection), and makes the acceleration sensor 11 measure acceleration and the gyro sensor 12 measure angular velocity.

In step S12, the video and audio data processing unit 73 compresses video data supplied from the imager 61 by a predetermined system. The video and audio data processing unit 73 records data obtained by compressing the video data in the video and audio data DB 74. In addition, the video and audio data processing unit 73 compresses audio data supplied from the microphone 62 by a predetermined system. The video and audio data processing unit 73 records data obtained by compressing the audio data in the video and audio data DB 74.

Sensor data output from the acceleration sensor 11 and the gyro sensor 12 is supplied to the action recognizing unit 71 when the action recognition process is performed immediately after the sensor data is obtained, whereas when the action recognition process is performed in predetermined timing, the sensor data is supplied to the storage 53 or the like to be recorded therein. The process thereafter returns to step S1 in FIG. 11 to perform the subsequent processes.

Details of the action recognition process performed in step S2 in FIG. 11 will next be described with reference to a flowchart of FIG. 13.

In step S21, the feature extracting unit 81 of the action recognizing unit 71 extracts features such as a walk pace, a walk intensity, gravity, and a heading direction as described above on the basis of acceleration sensor data as output of the acceleration sensor 11 and gyro sensor data as output of the gyro sensor 12. The sensor data processed by the feature extracting unit 81 is directly supplied from the acceleration sensor 11 and the gyro sensor 12 or recorded in the storage 53 or the like.

Feature data indicating the features extracted by the feature extracting unit 81 is output to the recognizing unit 82.

In step S22, the recognizing unit 82 accumulates a predetermined amount of the feature data supplied from the feature extracting unit 81, and recognizes the action of the user photographing holding the camcorder 1 on the basis of a time series of the accumulated feature data, referring to the HMM provided in the HMM DB 83.

In step S23, the recognizing unit 82 creates an action recognition result file in which information indicating actions such as "walk", "run", "standing still", "left turn", "right turn", and the like recognized in step S22 is associated with information indicating recognition intervals (for example time stamps indicating a start time and an end time of a recognition interval with a photographing start time as a reference or frame numbers of images photographed during a time corresponding to a recognition interval) or the like. The recognizing unit 82 records the created action recognition result file in the action recognition log DB 72. The process thereafter returns to step S2 in FIG. 11 to perform the subsequent process.

Details of the reproduction controlling process performed in step S3 in FIG. 11 will next be described with reference to a flowchart of FIG. 14.

In step S31, the player screen display controlling unit 91 of the viewing and reproduction controlling unit 75 reads the action recognition result file from the action recognition log DB 72. The process proceeds to step S32, where the player screen display controlling unit 91 refers to a start time and an end time of each action cluster (a set of intervals where the same action is recognized consecutively), the start time and the end time of each action cluster being described in the action recognition result file. For example, when the same action is recognized in a first recognition interval and a second recognition interval following the first recognition interval, the first and second recognition intervals are treated as one action cluster, and a start time of the first recognition interval and an end time of the second recognition interval are referred to.

In step S33, the player screen display controlling unit 91 displays the whole of the player screen of FIG. 3, and displays blocks representing a distribution of scenes associated with the same action in the block displaying part 23 of the player screen of FIG. 3 according to the start time and the end time of each action cluster referred to in step S32.

In step S34, the reproduction controlling unit 92 waits for the user to select an action. The process proceeds to step S35, where the reproduction controlling unit 92 determines whether an action is selected from the five actions in FIG. 3, for example.

The reproduction controlling unit 92 in step S35 stands by until the reproduction controlling unit 92 determines that an action is selected. When the reproduction controlling unit 92 determines that an action is selected, the process proceeds to step S36.

In step S36, the reproduction controlling unit 92 reads video data and audio data for reproducing a scene associated with the action selected by the user from the video and audio data DB 74, and starts reproducing the scene. When reproduction of all scenes associated with the action selected by the user is completed, for example, the process is ended.

With the above process, the user can narrow down scenes from all of photographed images by only selecting an action according to a scene desired to be viewed, and can thus find the scene desired to be viewed more easily than when finding the scene desired to be viewed from all of the photographed images.

Incidentally, in the above, text such as "walk", "run", "still", "turn_left", and "turn_right" is displayed as information indicating the respective actions in the block displaying part 23 of the player screen displayed by the player screen display controlling unit 91. However, when icons (animations) as shown in FIGS. 15A to 15E indicating the respective actions are provided for the player screen display controlling unit 91, these animations may be displayed in the block displaying part 23 in place of the text.

Figure 16:
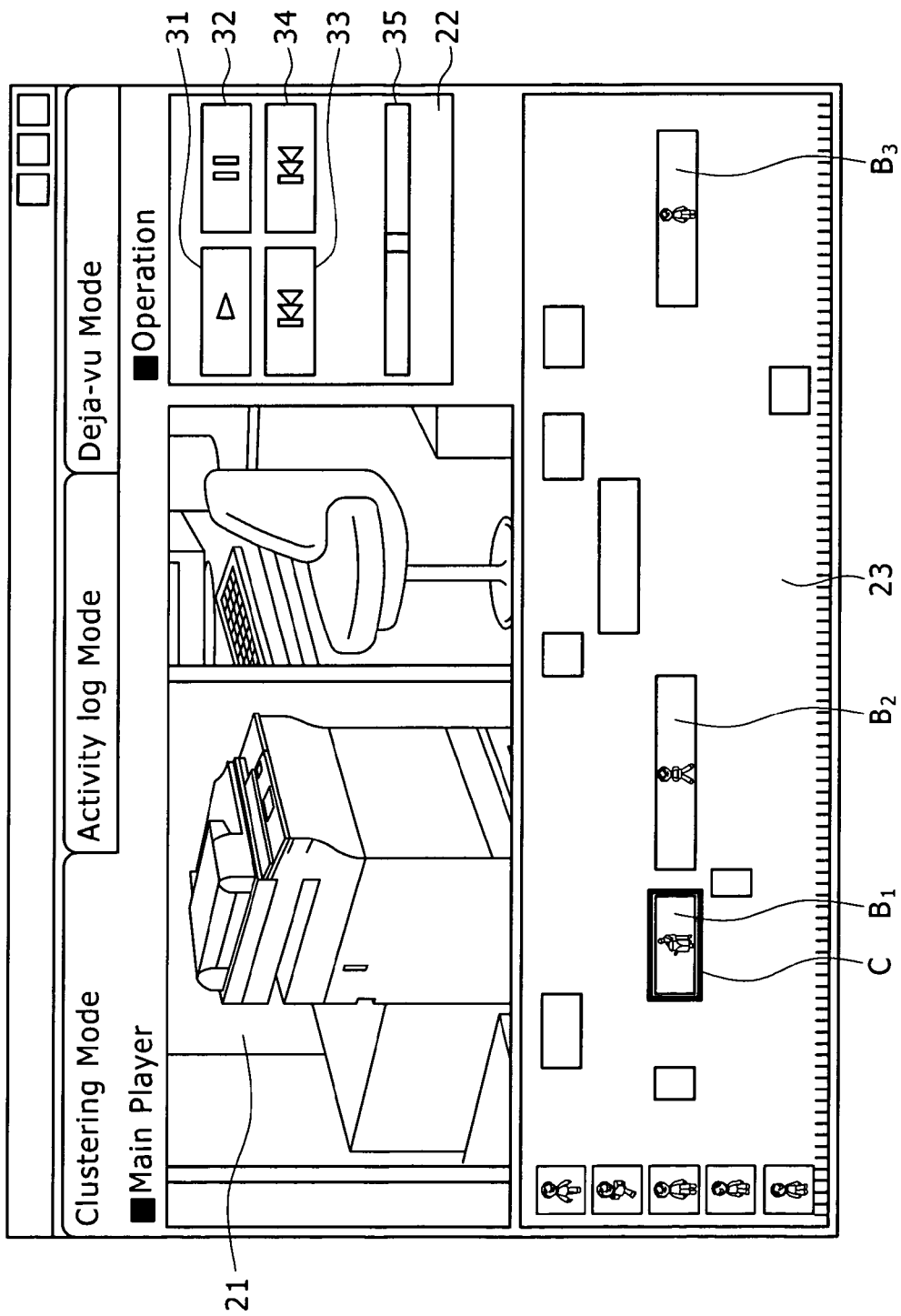
FIG. 16 is a diagram showing another example of display of the player screen.

When the animations of characters performing the respective actions are displayed, the user can select an action more intuitively than when the text is displayed. FIG. 16 shows an example of a player screen displaying the animations shown in FIGS. 15A to 15E in a block displaying part 23.

In addition, while in the above, the user can select one action from the five actions of "walk", "run", "standing still", "left turn", and "right turn", degrees of the selected action may further be selected.

A level appearing in the acceleration sensor data and the gyro sensor data indicates a degree of action performed by the user at the time, or specifically at which rate the user was running, for example. Thus, after one action of "run" is selected, an action associated with a scene desired to be reproduced may further be selected from different degrees of "run" such as "running vigorously", "running normally", "almost walking" and the like.

Further, when degrees of action can be thus selected and when the icons of FIGS. 15A to 15E are provided for the player screen display controlling unit 91, differences between the degrees may be represented by icon size.

Figure 17:
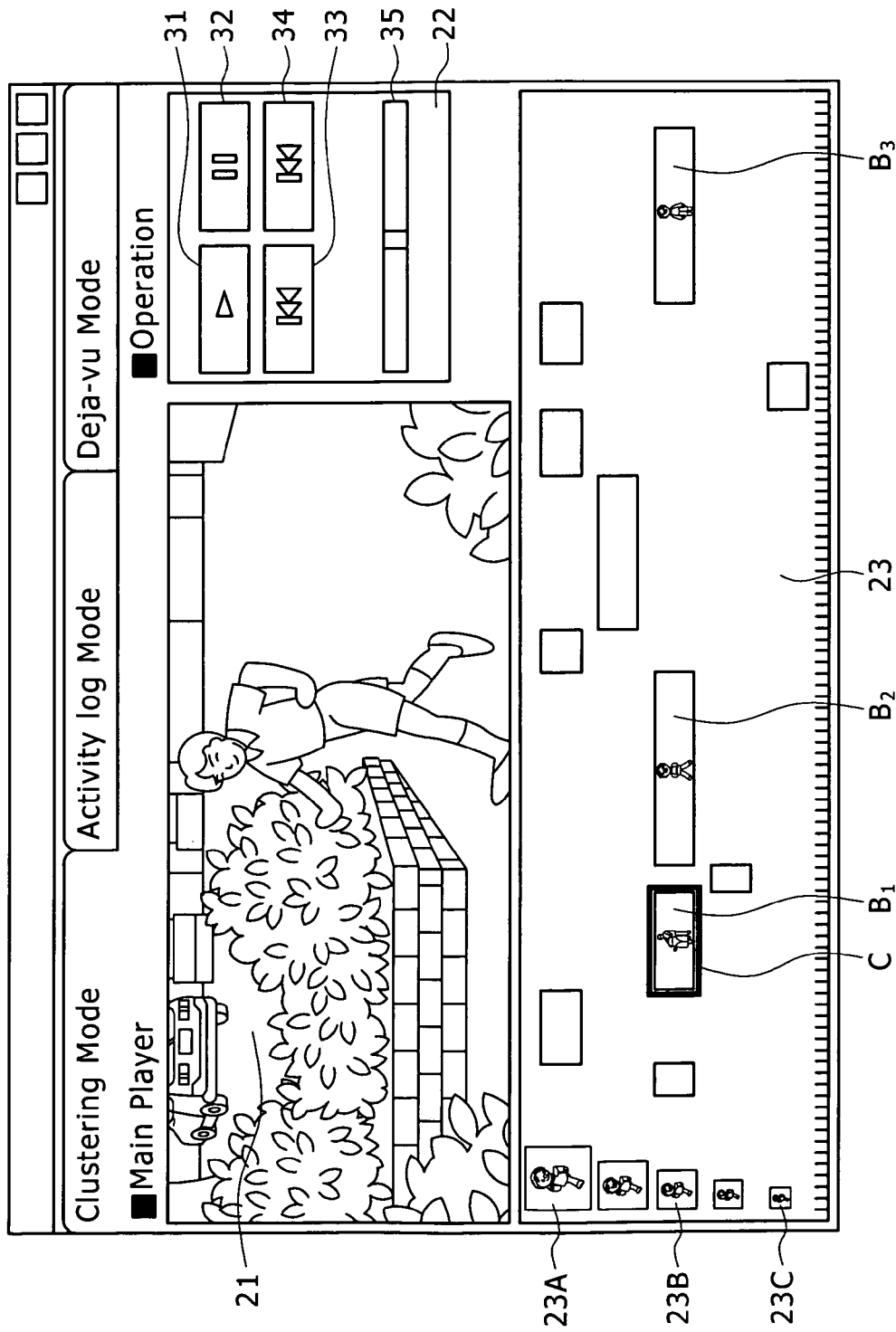
FIG. 17 is a diagram showing yet another example of display of the player screen.

FIG. 17 is a diagram showing an example of a player screen where differences between the degrees are represented by icon size. In this example, "run" is selected as an action type. For example, when an icon representing "run" (a second icon from the top displayed in the block displaying part 23 in FIG. 16) is selected from the screen shown in FIG. 16, the display of the block displaying part 23 is changed to that shown in FIG. 17.

Of icons representing "run" which icons are shown in FIG. 17, an icon 23A displayed in a largest size represents "running vigorously". An icon 23B displayed in a medium size represents "running normally". An icon 23C displayed in a smallest size represents "almost walking". Thus, a degree of action is represented by icon size, whereby the user can intuitively select a degree of action associated with a scene desired to be viewed.

Incidentally, a scene in which a child is running is displayed in the image displaying part 21 in FIG. 17, and a degree of "run" represented by an icon in the block displaying part 23 is not a degree of "run" of the user holding the camcorder 1 but a degree of "run" of the child photographed as a subject.

As will be described later, it is possible to include the acceleration sensor 11 and the gyro sensor 12 that output sensor data used for action recognition in a device having a shape of a badge, for example, that can perform radio communication with the camcorder 1 rather than include the acceleration sensor 11 and the gyro sensor 12 in the camcorder 1. In this case, action recognized by the camcorder 1 receiving sensor data transmitted from the badge is not the action of the user holding the camcorder 1 but the child or the like wearing the badge. Thus, at a time of reproducing an image taken with the child wearing the badge as a subject, for example, the user can select the action of the child to search for a scene desired to be viewed.

Figure 18:
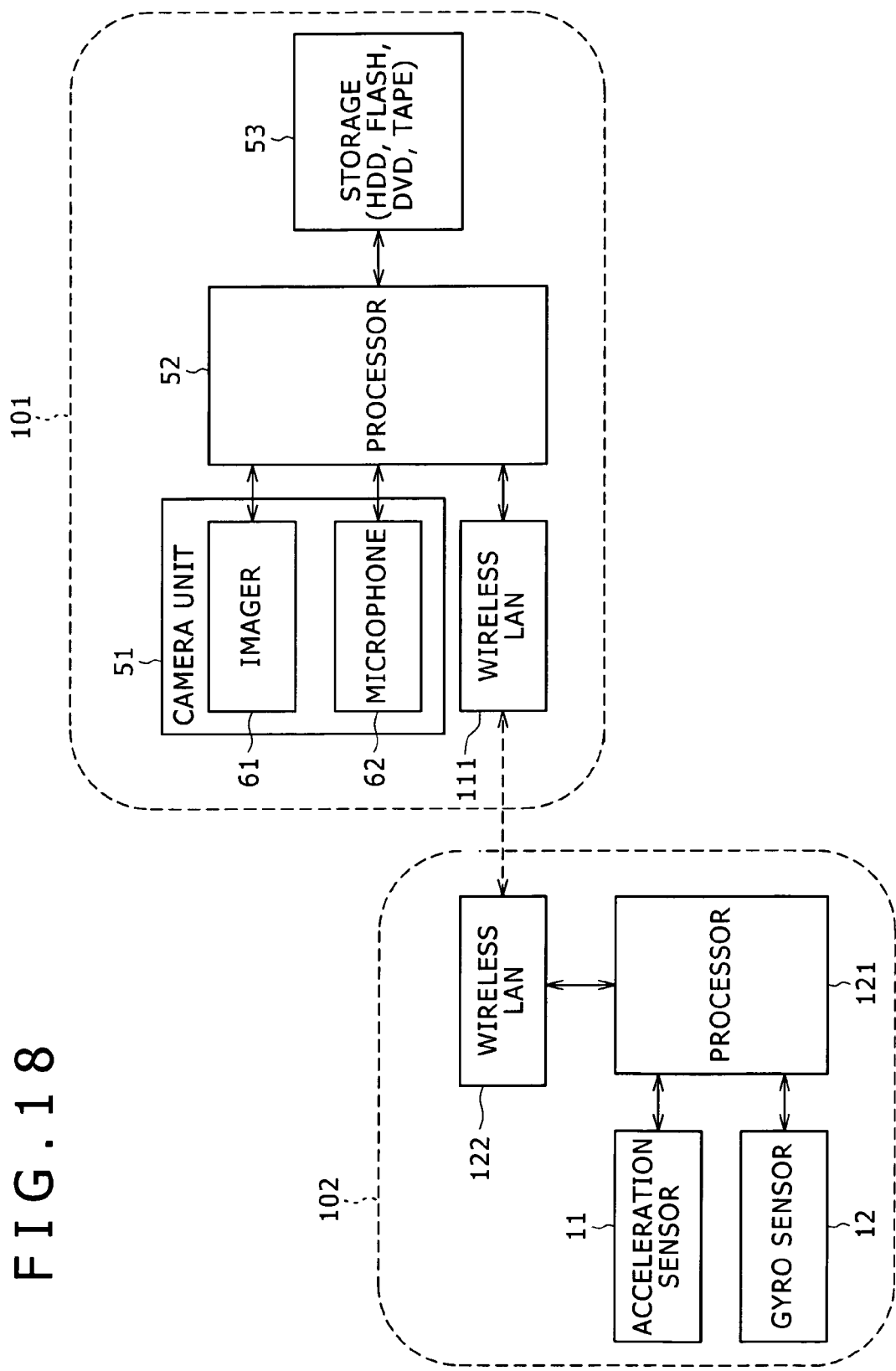
FIG. 18 is a block diagram showing an example of hardware configuration of each of a camcorder and a sensor badge.

FIG. 18 is a block diagram showing an example of hardware configuration in a case where the acceleration sensor 11 and the gyro sensor 12 outputting sensor data are thus included in a sensor badge as a device having a different casing from that of the camcorder 1. The same components as shown in FIG. 4 are identified by the same reference numerals.

A camcorder 101 in FIG. 18 does not include an acceleration sensor 11 or a gyro sensor 12. The camcorder 101 includes a camera unit 51, a processor 52, a storage 53, and a wireless LAN (Local Area Network) module 111. Incidentally, in place of the wireless LAN module 111, a module that performs communication by Bluetooth (trademark), Wireless USB (Wireless Universal Serial Bus), or UWB (Ultra Wide Band) may be provided, and communication with the sensor badge 102 may be performed by the module.

On the other hand, the sensor badge 102 includes an acceleration sensor 11 and a gyro sensor 12. In addition, the sensor badge 102 includes a processor 121 for starting measurement by the acceleration sensor 11 and the gyro sensor 12 and transmitting a result of the measurement to the camcorder 101, and a wireless LAN module 122. A subject photographed by using the camcorder 101 wears the sensor badge 102.

Also in the case of such a configuration in which action to be recognized is the action of the subject rather than the action of the photographer, the camcorder 101 performs processes basically similar to the processes described with reference to FIGS. 11 to 14.

Specifically, when an instruction to start photographing is given by the user, the processor 52 of the camcorder 101 controls the camera unit 51 to make the camera unit 51 perform photographing. The processor 52 also generates a command to start measurement for acceleration sensor data and gyro sensor data, and then transmits the generated command from the wireless LAN module 111 to the sensor badge 102.

In the sensor badge 102, the wireless LAN module 122 receives the command from the camcorder 101, and the processor 121 executes the received command, whereby measurement by the acceleration sensor 11 and the gyro sensor 12 is started. Acceleration sensor data obtained by the acceleration sensor 11 and gyro sensor data obtained by the gyro sensor 12 are output to the processor 121. The processor 121 transmits the sensor data from the wireless LAN module 122 to the camcorder 101.

The transmission of the sensor data from the sensor badge 102 to the camcorder 101 is repeated until a notification indicating an end of photographing is transmitted from the camcorder 101, for example.

In the camcorder 101 receiving the sensor data transmitted from the sensor badge 102, the sensor data is supplied to the processor 52. The processor 52 recognizes action as described above, that is, the action of the subject wearing the sensor badge 102 in this case, and records the action as a result of the recognition in association with a photographed image.

The player screen of FIG. 3 is displayed at a time of reproduction of the photographed image. The user can select the action of the subject from the player screen to find a scene desired to be viewed.

For example, in a case where the sensor badge 102 was attached to a child and an athletic meet in which the child participated was photographed, when the user desires to view a "scene of the child running in a footrace", the user can find only such a predetermined scene among all of photographed images by selecting "run" on the player screen of FIG. 3 and changing a block being reproduced, for example.

Generally, "run" is recognized as the action of the child for a scene taken when the child is running in a footrace on the basis of outputs from the acceleration sensor 11 and the gyro sensor 12 included in the sensor badge 102, and the action is associated with the scene. Therefore, by selecting "run", the user can narrow down scenes by action, and easily find the "scene of the child running in a footrace".

In the above, the photographing process (sensor data obtaining process), the action recognition process, and the reproduction controlling process are all performed in the camcorder. However, at least one of the action recognition process and the reproduction controlling process other than the photographing process may be performed in a personal computer/home server 132 that captures data from a camcorder 131 as shown in FIG. 19.

Figure 19:
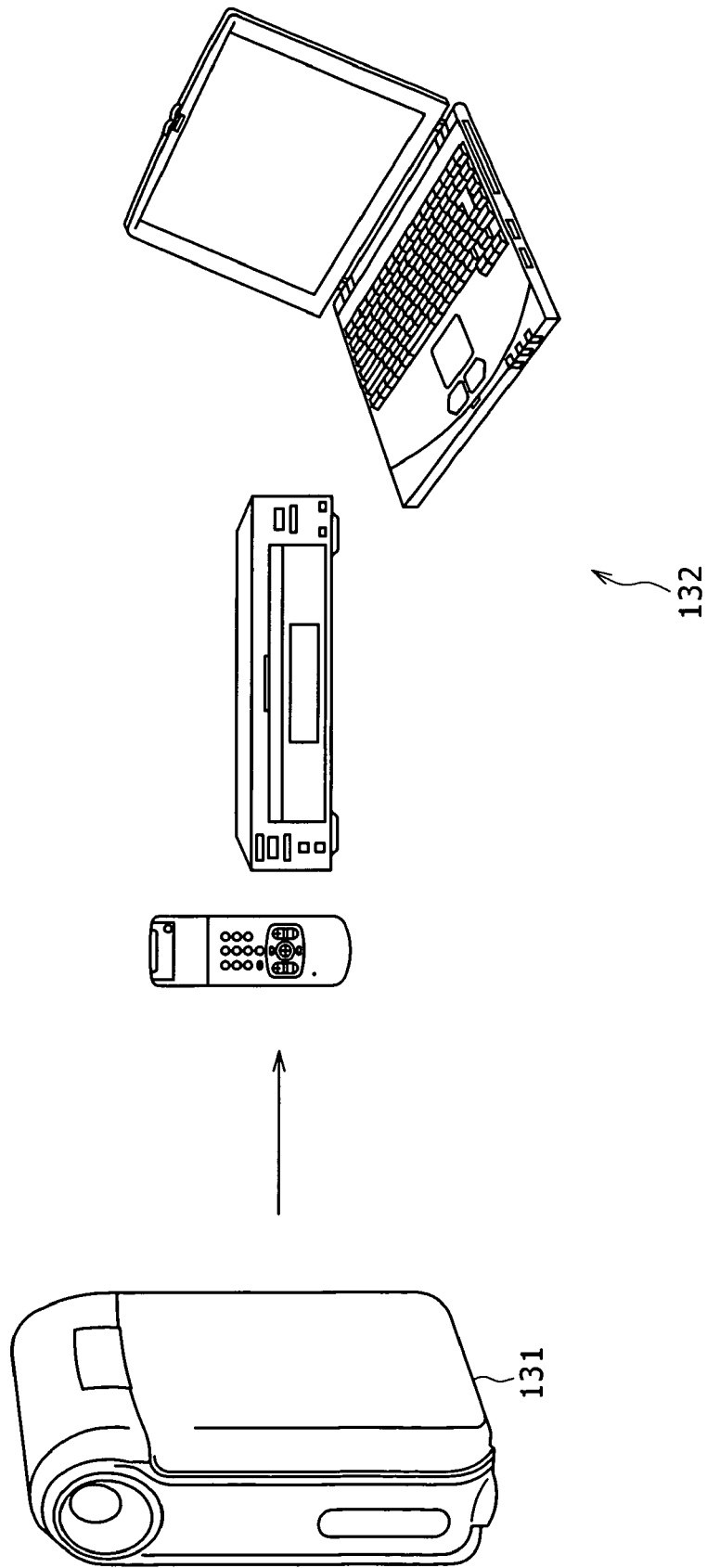
FIG. 19 is a diagram showing a camcorder and a personal computer/home server.

The camcorder 131 in FIG. 19 includes at least a camera unit 51, a processor 52, and a storage 53 as in the case of the camcorder 1 of FIG. 4. An acceleration sensor 11 and a gyro sensor 12 may be included in the camcorder 131, or may be included in a device external to the camcorder 131 as described above with reference to FIG. 18.

Figure 20:
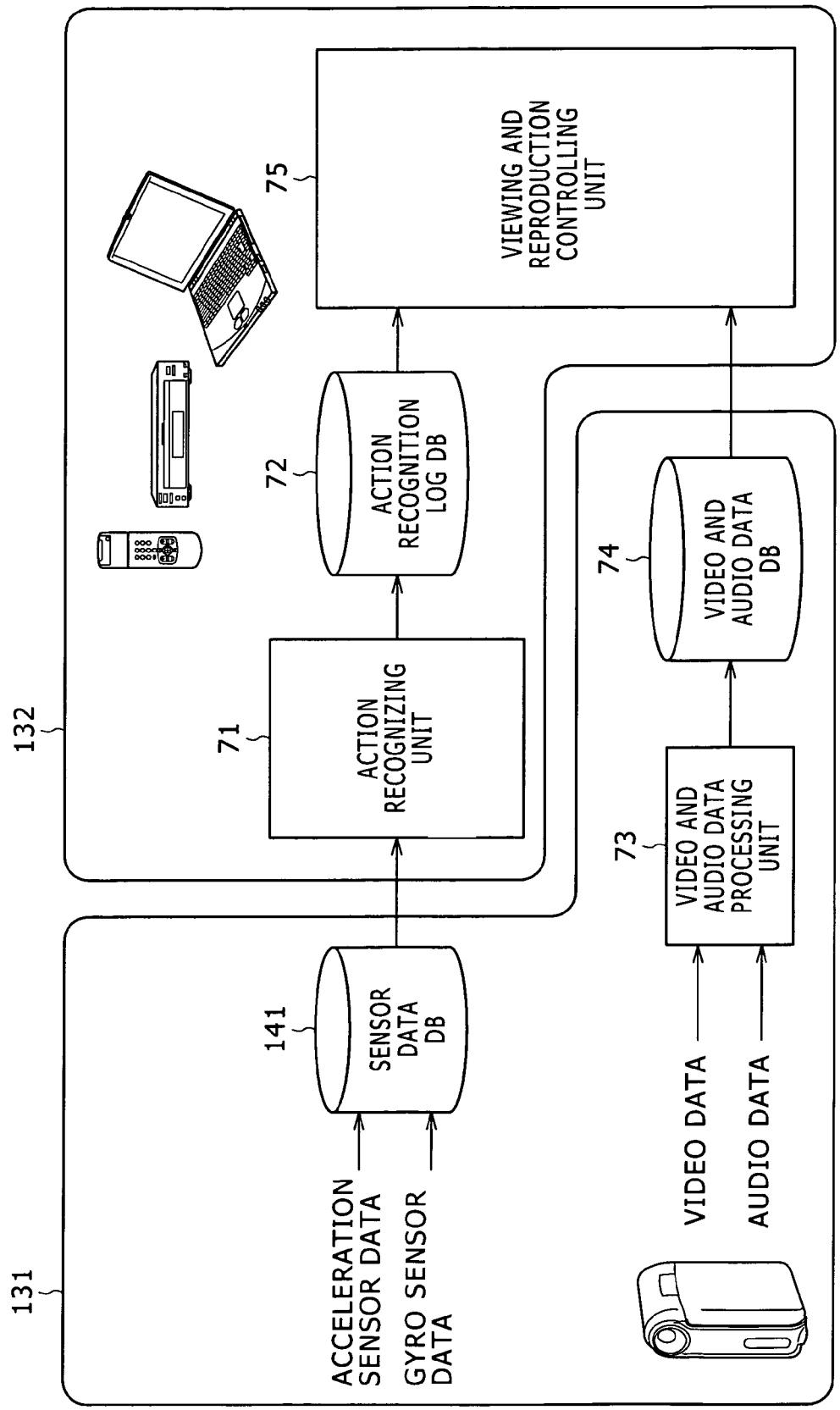
FIG. 20 is a block diagram showing an example of software configuration of each of the camcorder and the personal computer/home server.

FIG. 20 is a block diagram showing an example of software configuration of each of the camcorder 131 and the personal computer/home server 132 in FIG. 19. The same components as in FIG. 5 are identified by the same reference numerals.

The camcorder 131 includes a video and audio data processing unit 73 and a video and audio data DB 74 among the components shown in FIG. 5. The camcorder 131 also includes a sensor data DB 141 for recording acceleration sensor data obtained by the acceleration sensor 11 and gyro sensor data obtained by the gyro sensor 12 as they are (as raw data in FIG. 8, for example).

Figure 12:
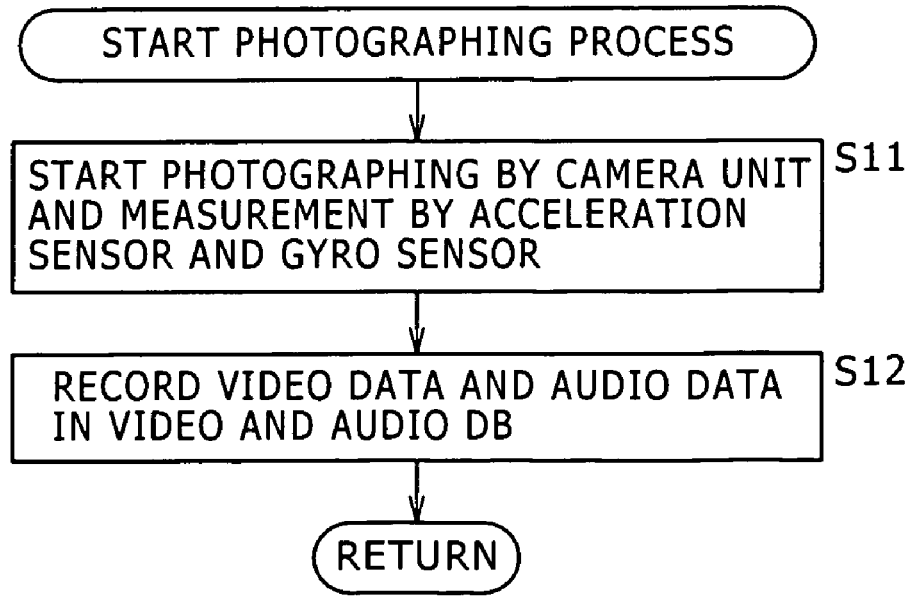
FIG. 12 is a flowchart of assistance in explaining details of a photographing process performed in step S1 in FIG. 11.

The camcorder 131 having such a configuration performs a process similar to the photographing process of FIG. 12. Specifically, video data and audio data obtained by photographing are recorded in the video and audio data DB 74, and sensor data obtained in the same timing as that of the photographing is recorded in the sensor data DB 141.

On the other hand, the personal computer/home server 132 includes an action recognizing unit 71, an action recognition log DB 72, and a viewing and reproduction controlling unit 75 among the components shown in FIG. 5.

The personal computer/home server 132 is also provided with a function unit for performing communication by wire or by radio with the camcorder 131. By performing the communication, the personal computer/home server 132 captures, from the camcorder 131, the acceleration sensor data and the gyro sensor data recorded in the sensor data DB 141 and the video data and the audio data recorded in the video and audio data DB 74. The acceleration sensor data and the gyro sensor data captured from the camcorder 131 are supplied to the action recognizing unit 71 in the personal computer/home server 132, and the video data and the audio data are supplied to the viewing and reproduction controlling unit 75.

Figure 13:
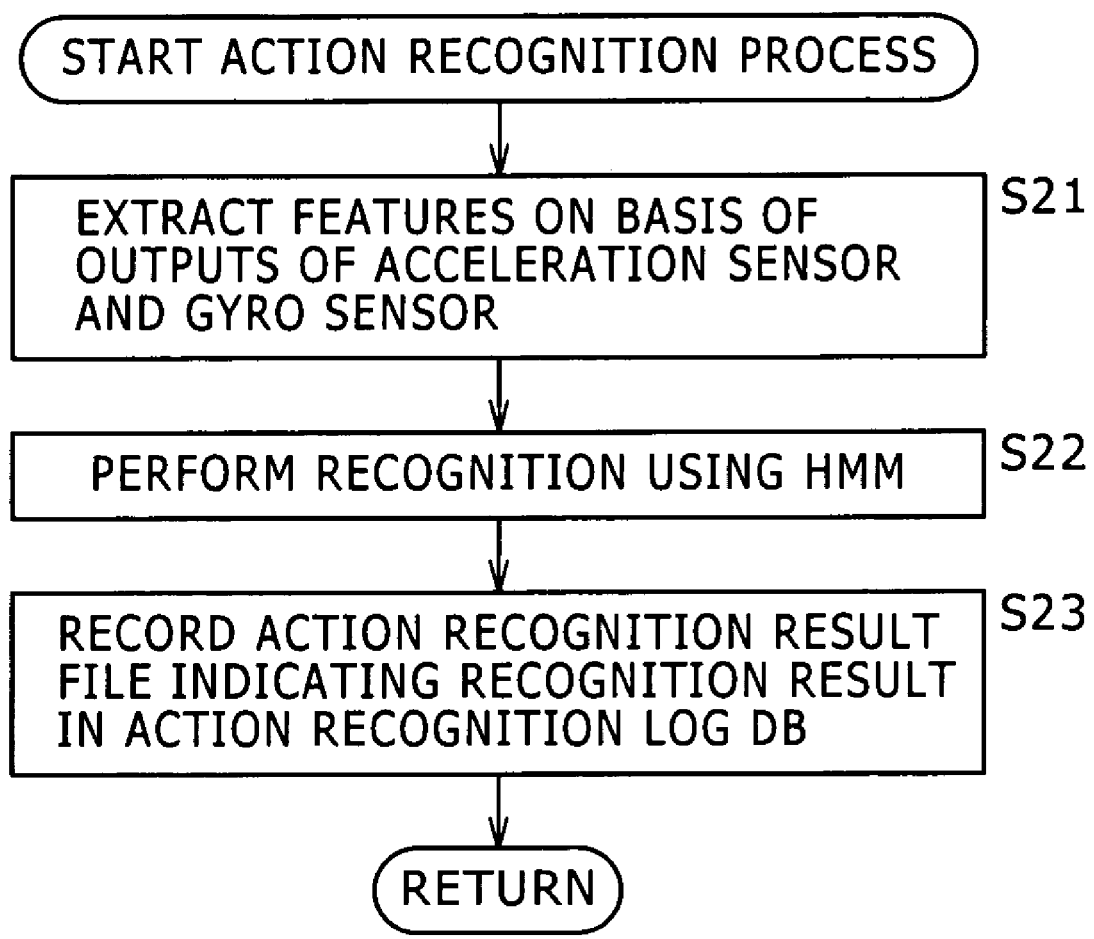
FIG. 13 is a flowchart of assistance in explaining details of an action recognition process performed in step S2 in FIG. 11.

The action recognizing unit 71 in the personal computer/home server 132 having such a configuration performs a process similar to the action recognition process of FIG. 13 on the basis of the acceleration sensor data and the gyro sensor data captured from the camcorder 131. The viewing and reproduction controlling unit 75 performs a process similar to the reproduction controlling process of FIG. 14 on the basis of an action recognition result obtained by the action recognizing unit 71 and the video data and the audio data captured from the camcorder 131.

That is, also in the case where the components of FIG. 5 are implemented over a plurality of devices as shown in FIG. 20, the plurality of devices perform the series of processes in FIG. 10 to implement a digest reproduction or the like.

Figure 21:
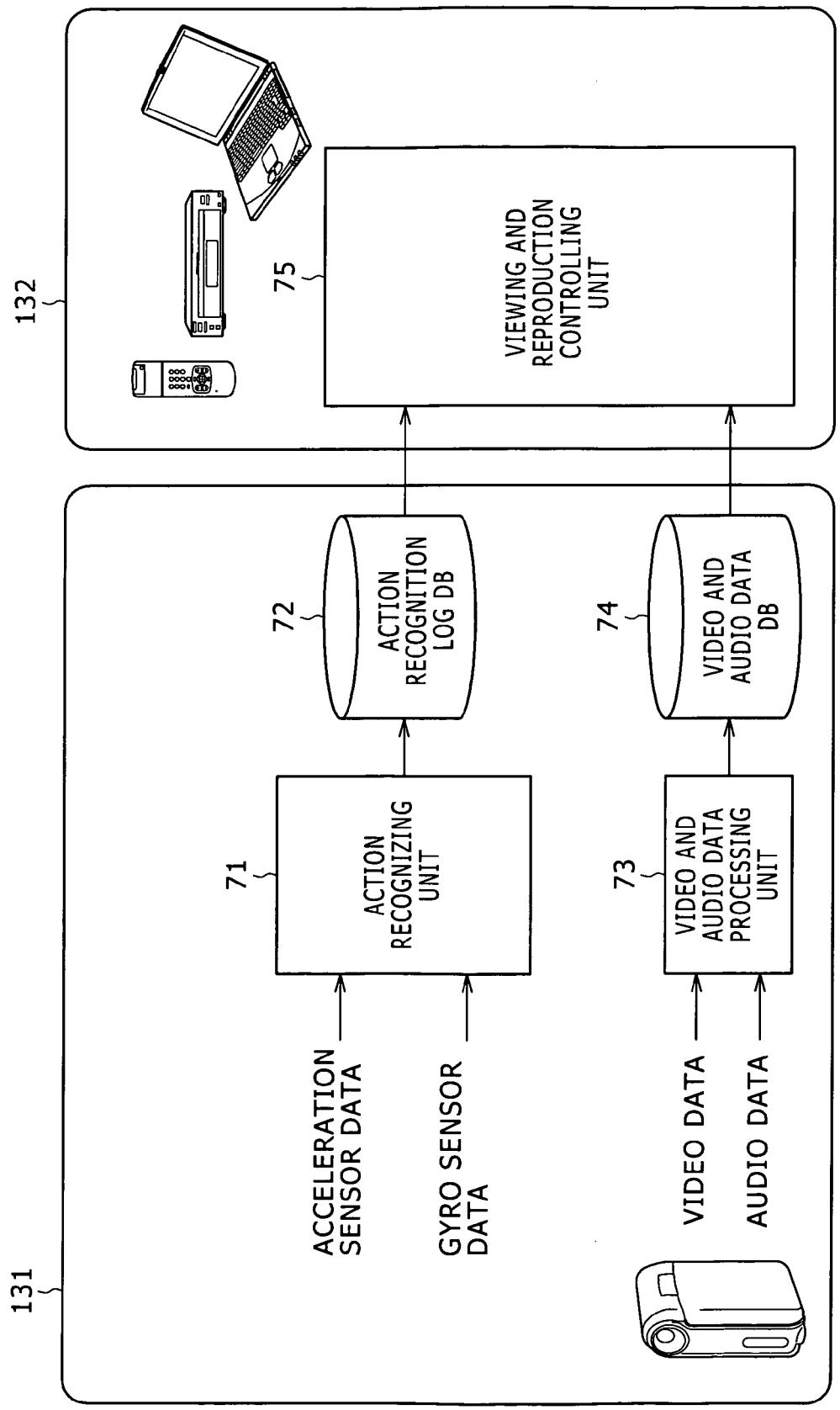
FIG. 21 is a block diagram showing another example of software configuration of each of the camcorder and the personal computer/home server.

FIG. 21 is a block diagram showing another example of software configuration of each of the camcorder 131 and the personal computer/home server 132. The same components as in FIG. 5 are identified by the same reference numerals.

In the example of FIG. 21, the camcorder 131 includes an action recognizing unit 71, an action recognition log DB 72, a video and audio data processing unit 73, and a video and audio data DB 74 among the components shown in FIG. 5.

The camcorder 131 having such a configuration performs processes similar to the photographing process of FIG. 12 and the action recognition process of FIG. 13. Specifically, video data and audio data obtained by photographing are recorded in the video and audio data DB 74, and an action recognition result obtained on the basis of sensor data obtained in the same timing as that of the photographing is recorded in the action recognition log DB 72.

On the other hand, the personal computer/home server 132 includes a viewing and reproduction controlling unit 75 among the components shown in FIG. 5. The personal computer/home server 132 is provided with a function unit for performing communication by wire or by radio with the camcorder 131. By performing the communication, the personal computer/home server 132 captures, from the camcorder 131, the action recognition result recorded in the action recognition log DB 72 and the video data and the audio data recorded in the video and audio data DB 74.

Figure 14:
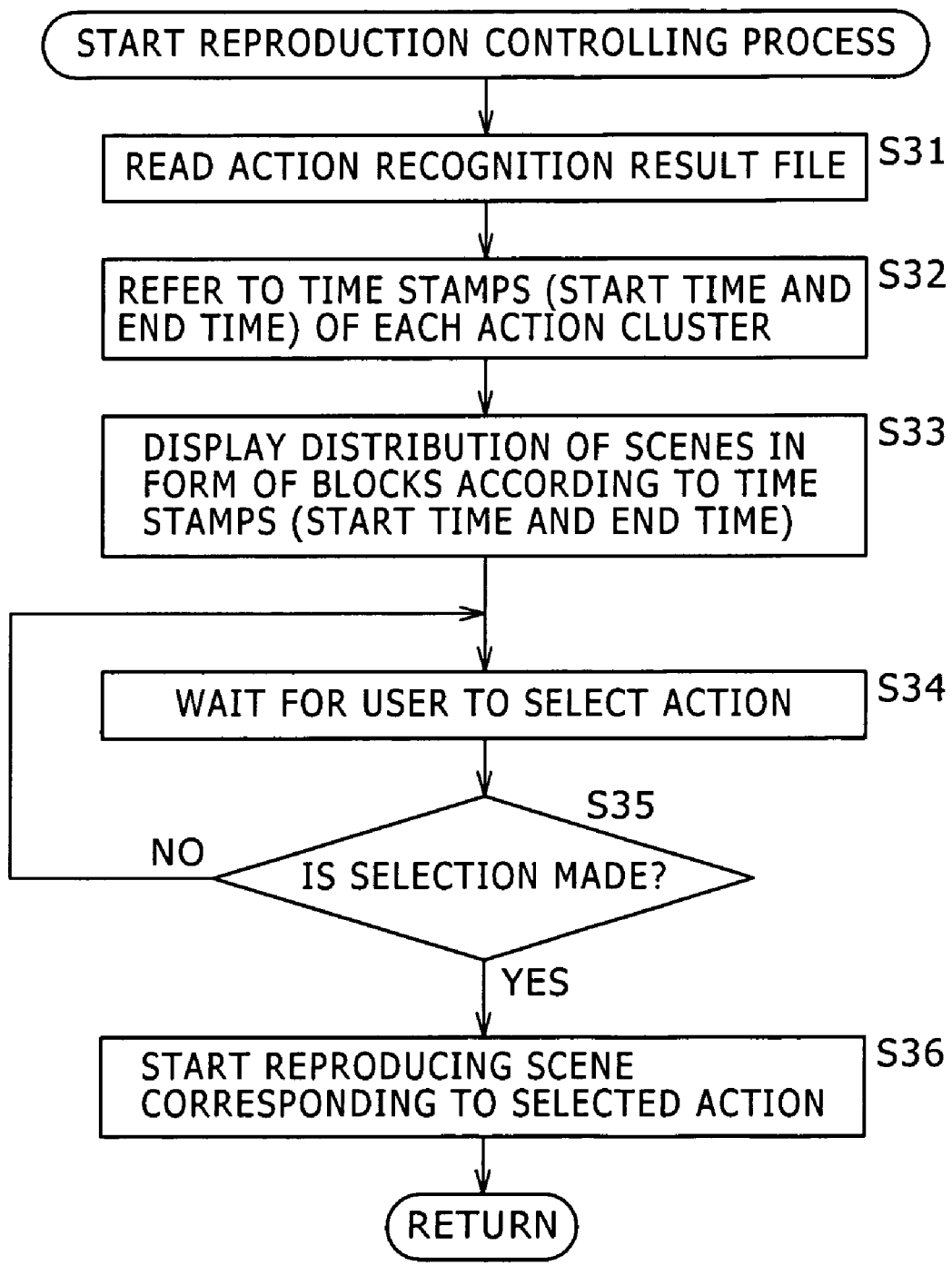
FIG. 14 is a flowchart of assistance in explaining details of a reproduction controlling process performed in step S3 in FIG. 11.
Figure 15A:
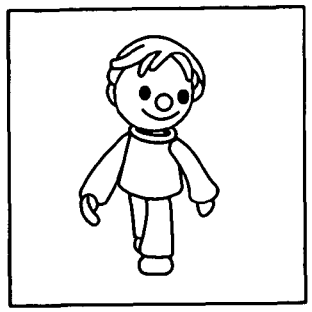
FIGS. 15A, 15B, 15C, 15D, and 15E are diagrams showing an example of characters.
Figure 15B:
Figure 15C:
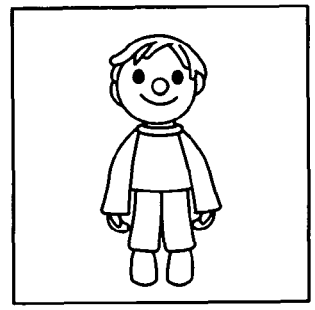
Figure 15D:
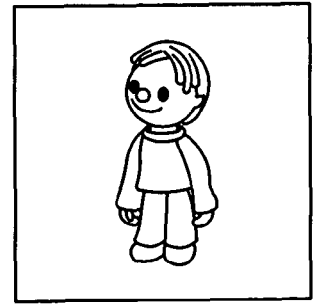
Figure 15E:
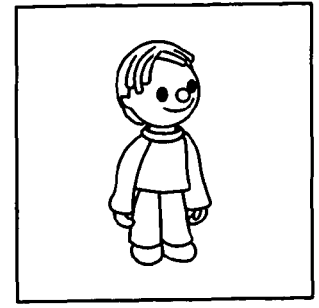

The viewing and reproduction controlling unit 75 in the personal computer/home server 132 performs a process similar to the reproduction controlling process of FIG. 14 on the basis of the action recognition result and the video data and the audio data captured from the camcorder 131.

That is, also in the case where the components of FIG. 5 are implemented over a plurality of devices as shown in FIG. 21, the plurality of devices perform the series of processes in FIG. 10 to implement a digest reproduction or the like.

In the case where video and audio are reproduced on the basis of the action recognition result obtained from the acceleration sensor data and the gyro sensor data as described above, when a type of recognition result is changed in each short period such for example as one second instead of a same recognition result being obtained consecutively, a reproduction position is also changed accordingly, so that photographed images and the like are reproduced fragmentarily.

For example, when the camcorder including the acceleration sensor 11 and the gyro sensor 12 is put on a table or is dropped accidentally while the user is photographing in a sitting state, "walk" is recognized as the action of the user at a moment because of an impulse at that time. Thus, even though "standing still" is selected at a time of reproduction because the whole of a scene when the user was photographing while sitting is desired to be viewed, a scene where "walk" is recognized is skipped.

Therefore the action of a person which action is recognized for such a short time may be regarded as noise and removed, and a recognition result may be thus corrected so that reproduction in a relatively long unit is performed at a reproduction time. This correction is performed on the basis of contents of photographed images, for example.

Figure 22:
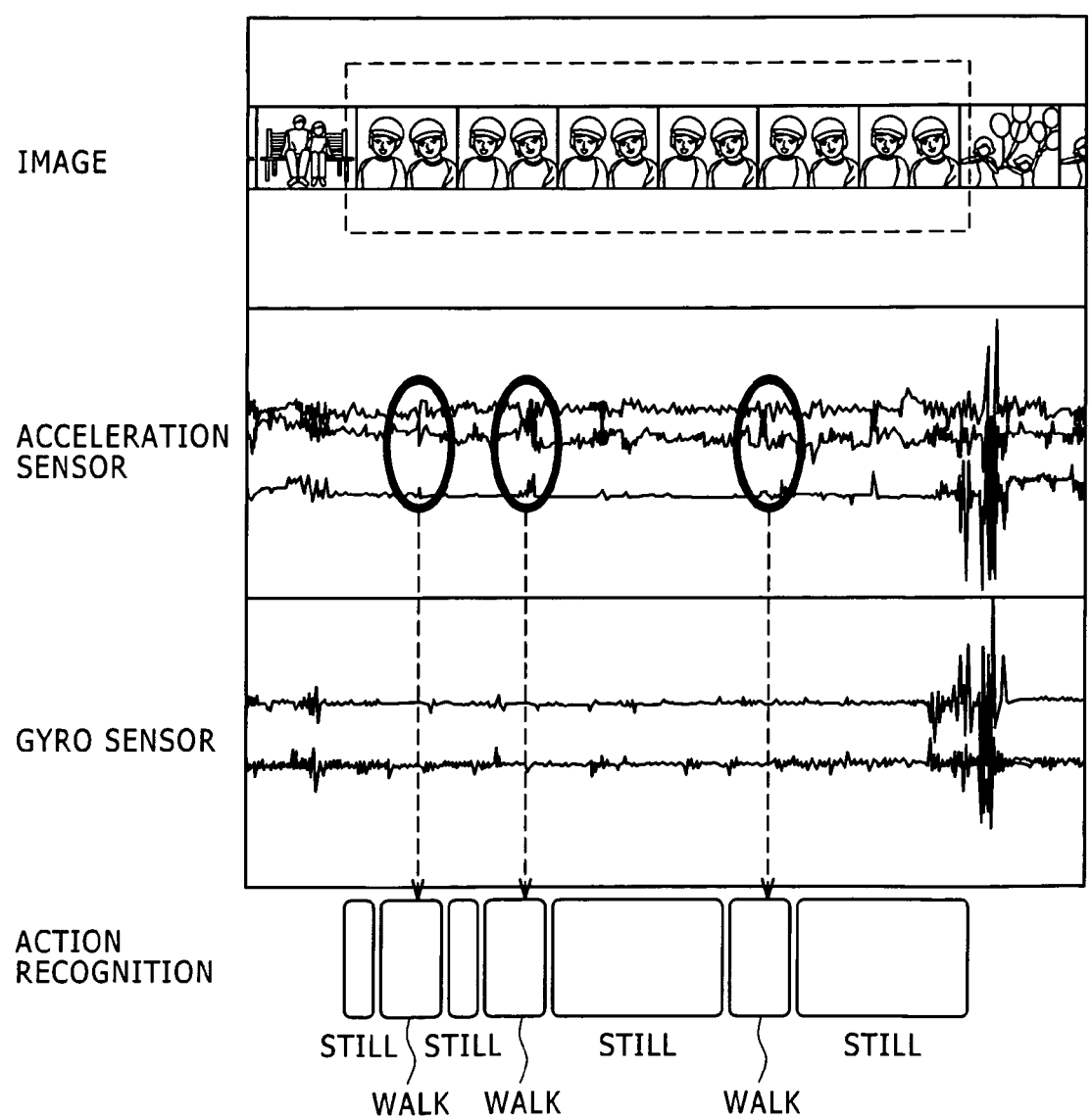
FIG. 22 is a diagram of assistance in explaining noise included in recognition results.

FIG. 22 is a diagram of assistance in explaining noise included in recognition results.

An example of photographed images is shown at the top of FIG. 22, and an example of acceleration sensor data and gyro sensor data obtained by measurement at the time of photographing is shown under the example of the photographed images. In addition, an example of action recognition results is shown under these pieces of sensor data.

In FIG. 22, images enclosed by a dotted line are taken with a photographer in a sitting state, for example, and have similar subject contents. A higher instantaneous acceleration is measured in parts of the acceleration sensor data which parts are enclosed by a solid line circle than in other parts. "Walk" is recognized as an action recognition result in intervals corresponding to the parts enclosed by the circles, while "standing still" is recognized in the other parts.

That is, when the user desires to view all of the images enclosed by the dotted line in FIG. 22 continuously, a result of recognition of "walk" is partly included although it is desirable that one result of recognition of "standing still" be obtained over intervals corresponding to all of a time of reproduction of the images. Therefore, when "standing still" is selected and then reproduction is performed, images for which a result of recognition of "walk" is obtained are skipped, so that the reproduction is performed fragmentarily.

Hence, "walk" as the different recognition result thus partly obtained is removed according to the contents of the photographed images, and the recognition results are thus corrected.

Figure 23:
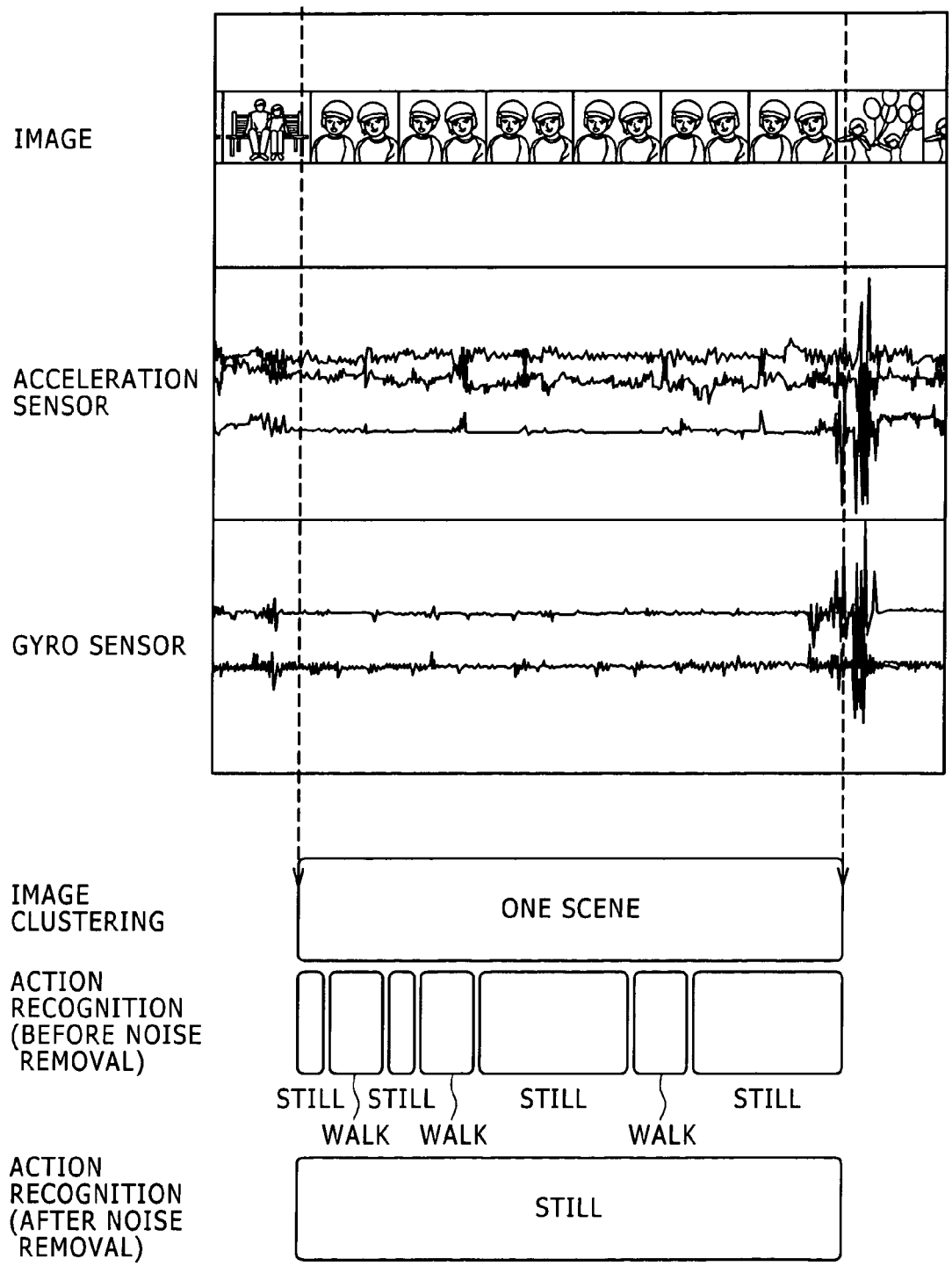
FIG. 23 is a diagram of assistance in explaining the correction of recognition results.

FIG. 23 is a diagram of assistance in explaining the correction of recognition results.

In FIG. 23, an image clustering result is shown under acceleration sensor data and gyro sensor data, and action recognition results before noise removal and an action recognition result after the noise removal based on the image clustering result are shown under the image clustering result.

Images are clustered according to similarity of contents, and all the images enclosed by a dotted line are recognized as one scene. Then, the percentage of each action recognition result (before noise removal) in an interval thus recognized as one scene is referred to. When the percentage of a result of recognition of the action "standing still" is 85%, and the percentage of a result of recognition of the action "walk" is 15%, for example, parts of "walk" whose percentage is low at 15% are removed as noise, and one result of recognition of "standing still" over the entire interval recognized as one scene is obtained as a recognition result after the noise removal.

For example, 20% is set as a percentage threshold value, and when a reproduction time of images associated with a result of recognition of "walk" whose percentage is not more than the threshold value is less than two seconds, for example, the "walk" is determined to be noise and removed.

Thus the user can continuously view one scene composed of similar images by selecting "standing still".

The clustering of images, the recognition of one scene, referring to the percentages of actions, and the removal of noise on the basis of the percentages of the actions as described above are performed by the viewing and reproduction controlling unit 75, for example.

Incidentally, while the clustering of images may be performed by any algorithm, techniques disclosed in Japanese Patent Application No. 2004-234392 previously filed by the present applicant, for example, may be used. In addition, instead of using a result of clustering photographed images, an interval during which sounds having similar characteristics are recorded may be determined to represent one scene, and the result may be used for noise removal.

Figure 24:
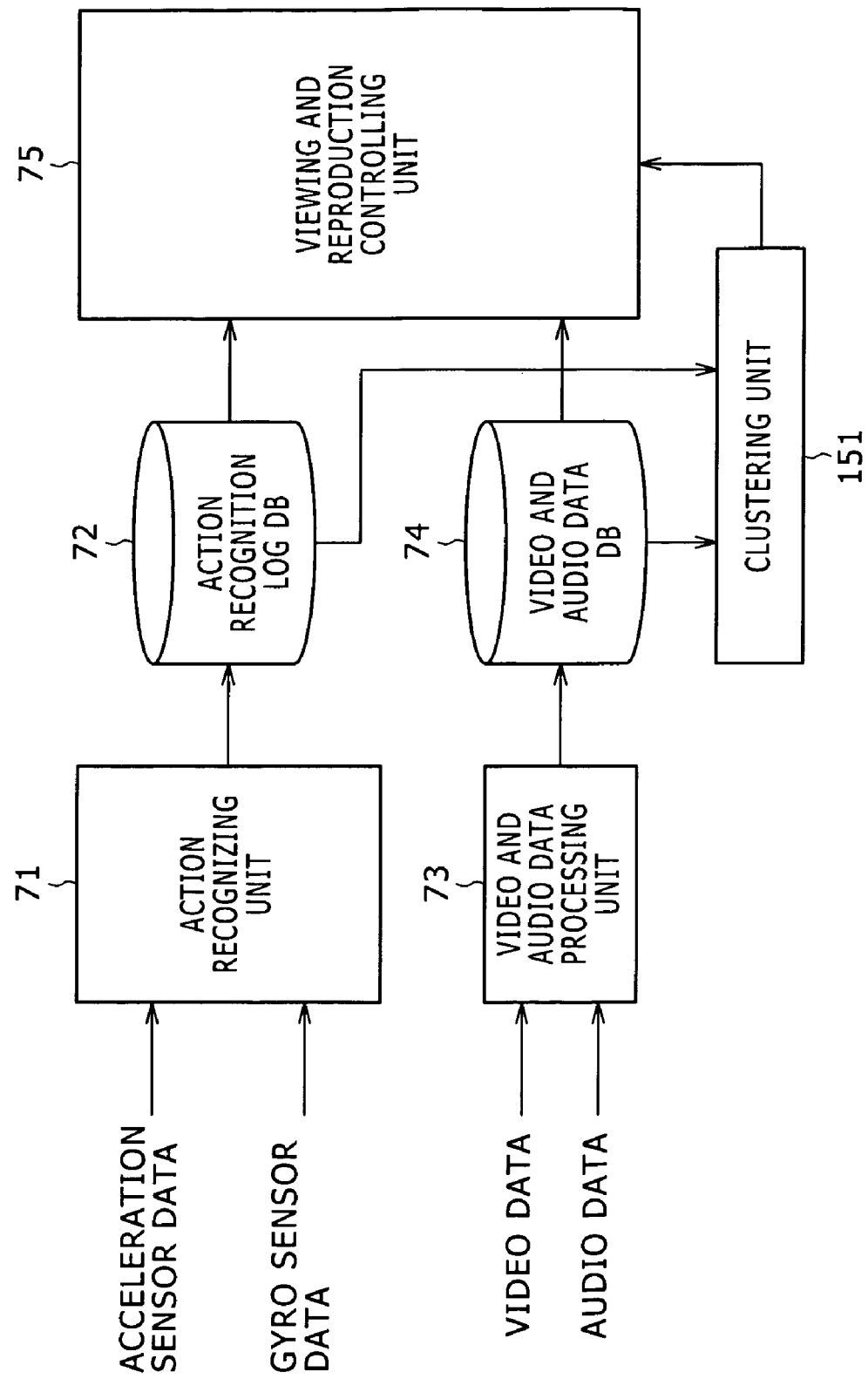
FIG. 24 is a block diagram showing another example of software configuration of the camcorder.

FIG. 24 is a block diagram showing another example of software configuration of the camcorder 1. The same components as shown in FIG. 5 are identified by the same reference numerals. Repeated description of the same components will be omitted as appropriate.

A clustering unit 151 reads video data recorded in a video and audio data DB 74, for example extracts features of respective frames, and classifies the whole of the read video data into a plurality of clusters on the basis of the extracted features. The clustering unit 151 creates a clustering result file indicating which images belong to which clusters, and stores the clustering result file. The stored clustering result file is read by a viewing and reproduction controlling unit 75 (noise removing unit 161 (FIG. 25)) as occasion arises.

Figure 25:
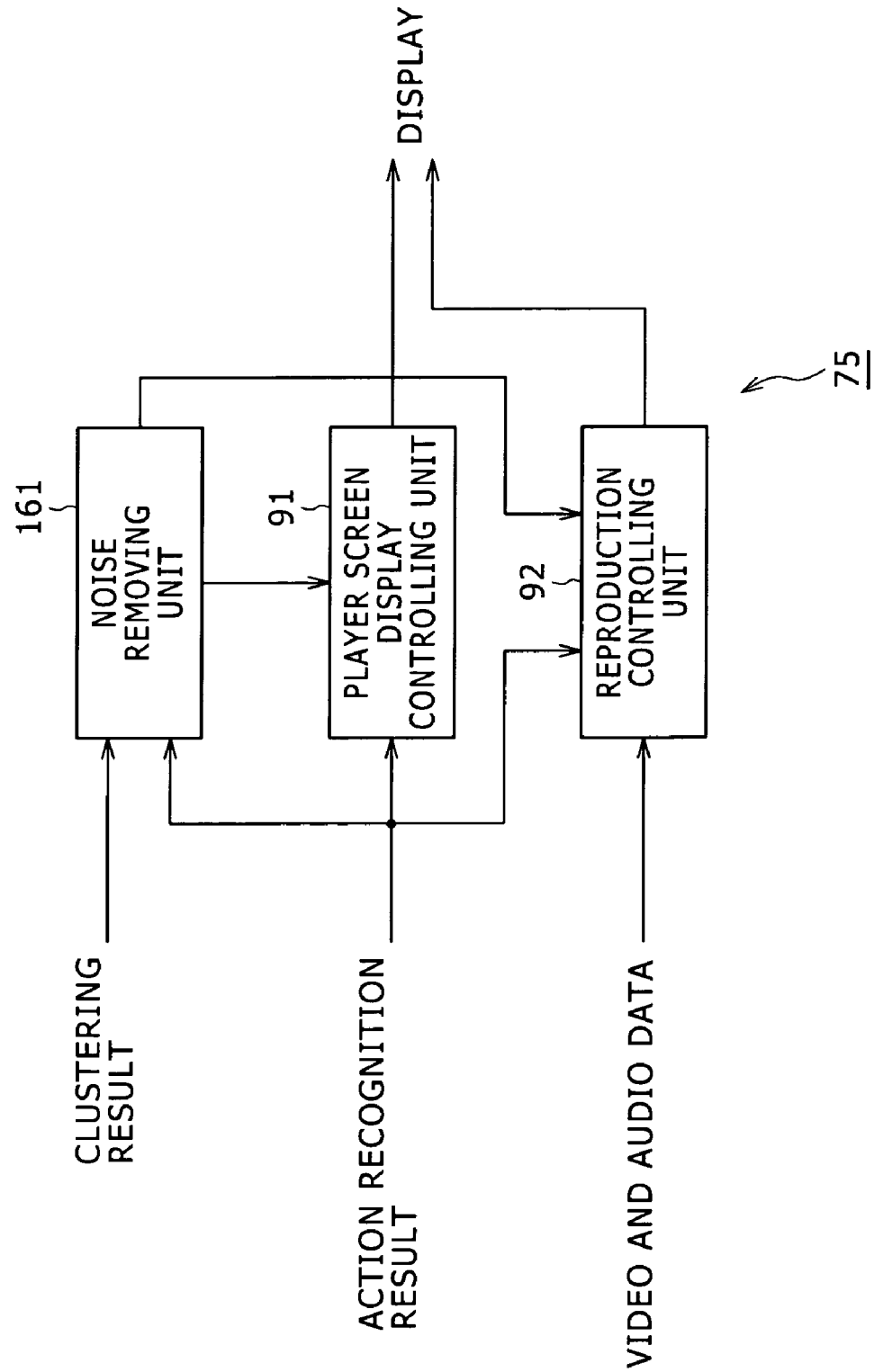
FIG. 25 is a block diagram showing an example of detailed configuration of a viewing and reproduction controlling unit in FIG. 24.

FIG. 25 is a block diagram showing an example of detailed configuration of the viewing and reproduction controlling unit 75 in FIG. 24. The same components as shown in FIG. 10 are identified by the same reference numerals. Repeated description of the same components will be omitted as appropriate.

A noise removing unit 161 obtains the percentage of each action recognized within one scene interval as described with reference to FIG. 23 on the basis of the clustering result file obtained from the clustering unit 151 and an action recognition result file obtained from an action recognition log DB 72.

Further, the noise removing unit 161 removes an action that is included at a percentage lower than a predetermined threshold value and is associated with images whose reproduction time is shorter than a threshold value when the images are reproduced, and thus makes action correction so that one action is associated with one scene.

Figure 26:
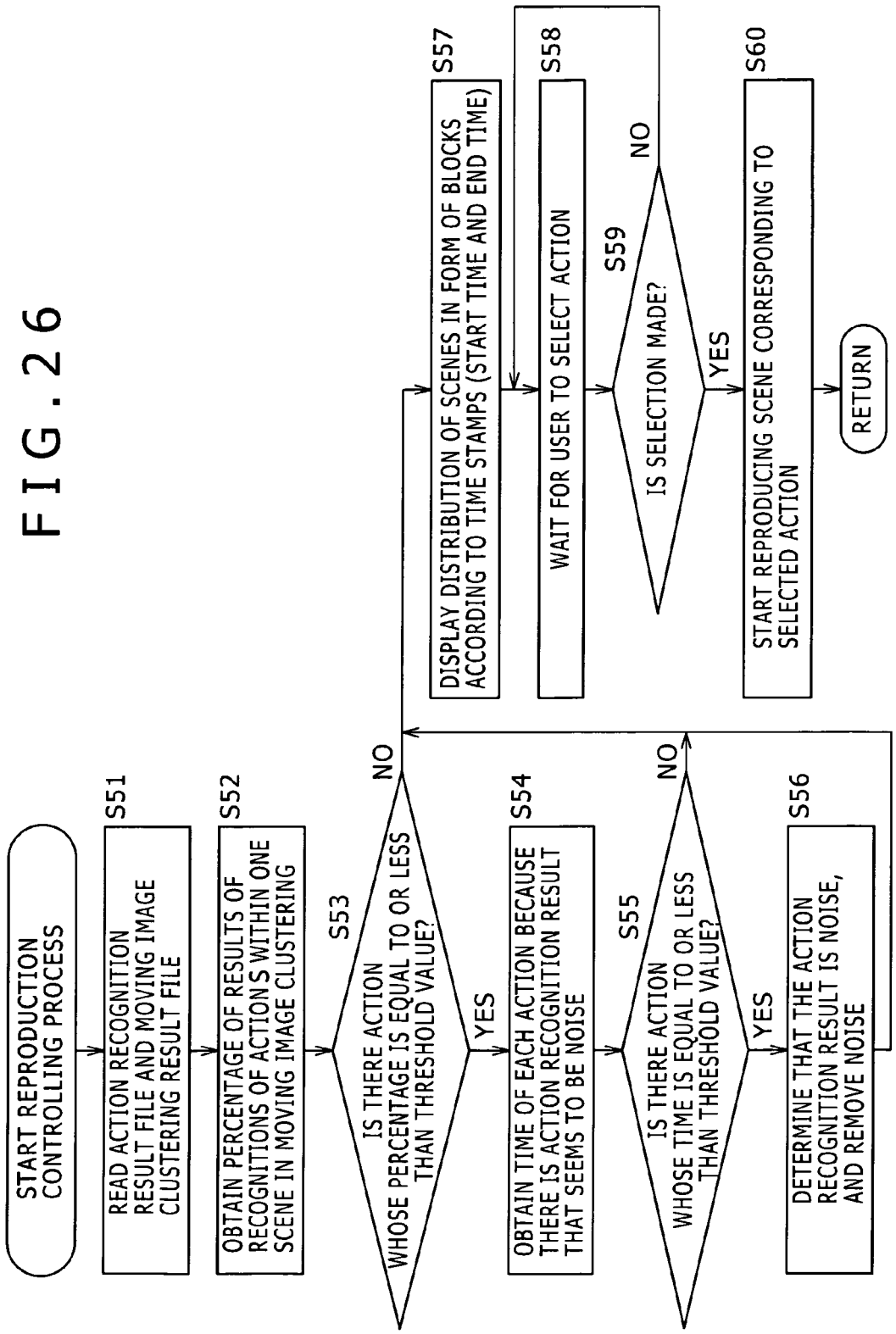
FIG. 26 is a flowchart of assistance in explaining details of another reproduction controlling process performed in step S3 in FIG. 11.

A reproduction controlling process that removes noise in recognition results as described above will next be described with reference to a flowchart of FIG. 26. This process is performed in step S3 in FIG. 11, for example, as in the case of the process of FIG. 14.

In step S51, the noise removing unit 161 of the viewing and reproduction controlling unit 75 reads an action recognition result file from the action recognition log DB 72, and reads a clustering result file from the clustering unit 151.

In step S52, the noise removing unit 161 directs attention to one scene (one cluster) on the basis of the clustering result file read from the clustering unit 151, and obtains the percentage of results of recognition of each action in an interval recognized as the one scene of interest on the basis of the action recognition result file read from the action recognition log DB 72.

In step S53, the noise removing unit 161 determines whether there is an action included in the interval recognized as one scene at a percentage equal to or less than a threshold value set at 20%, for example. When the noise removing unit 161 determines whether there is such an action, the process proceeds to step S54.

In step S54, the noise removing unit 161 obtains a reproduction time of images associated with the action included at such a low percentage. The process proceeds to step S55, where the noise removing unit 161 determines whether the obtained reproduction time is equal to or less than a threshold value set at two seconds, for example.

When the noise removing unit 161 determines in step S55 that the reproduction time is equal to or less than the threshold value, the process proceeds to step S56, where the noise removing unit 161 determines the action to be noise, and removes the noise from the recognition results in the interval recognized as one scene.

Thus, results of recognition of the action included at a percentage equal to or less than the threshold value and associated with images whose reproduction time is equal to or less than the threshold value when the images are reproduced are removed from the interval recognized as one scene. The recognition results from which the noise is removed are output to a player screen display controlling unit 91 and a reproduction controlling unit 92.

After the noise is removed in step S56, the process proceeds to step S57. When the noise removing unit 161 determines in step S53 that there is no action included in the interval recognized as one scene at a percentage equal to or less than the threshold value, and when the noise removing unit 161 determines in step S55 that the reproduction time is not equal to or less than the threshold value, the process similarly proceeds to step S57.

A process of step S57 and subsequent steps is basically the same as a process of step S33 and subsequent steps in FIG. 14 described above.

Specifically, in step S57, the player screen display controlling unit 91 displays the whole of a player screen, refers to the recognition result after correction supplied from the noise removing unit 161, and displays blocks representing a distribution of scenes associated with the same action in a block displaying part 23.

In step S58, the reproduction controlling unit 92 waits for the user to select an action. The process proceeds to step S59, where the reproduction controlling unit 92 determines whether an action is selected.

The reproduction controlling unit 92 in step S59 stands by until the reproduction controlling unit 92 determines that an action is selected. When the reproduction controlling unit 92 determines that an action is selected, the process proceeds to step S60.

In step S60, the reproduction controlling unit 92 reads video data and audio data for reproducing a scene associated with the action selected by the user from the video and audio data DB 74, and starts reproducing the scene. When reproduction of all scenes associated with the action selected by the user is completed, for example, the process is ended.

In the above, the user can select one action at a time of reproduction of photographed images. However, a plurality of actions may be selected.

When the user desires to view a "scene of doing some shopping in a shopping mall", the user can find only such a predetermined scene among all of photographed images by selecting "walk", "right turn", and "left turn" on the player screen of FIG. 3 and changing a block being reproduced, for example. In this case, blocks including scenes with which "walk", "right turn", and "left turn" are repeatedly associated as action recognition results are blocks to be reproduced.

Generally, "walk", "right turn", and "left turn" are recognized as the actions of the user as photographer for a scene taken when the user is doing some shopping on the basis of outputs from the acceleration sensor 11 and the gyro sensor 12 because the user browses around various stores and looks at articles, and the actions are associated with the scene. Therefore, by selecting "walk", "right turn", and "left turn", the user can narrow down scenes by action, and easily find the "scene of doing some shopping in a shopping mall".

The functions as described above may be incorporated into camcorders and also various devices having a photographing function. For example, the functions can be incorporated into various devices such for example as a digital camera, an IC recorder provided with a camera, a music player, and a portable telephone as shown in FIG. 27.

Further, photographing styles are not limited to a gun grip style shown on an upper left side of FIG. 28 as a photographing style for a camcorder, and various styles such as a photographing style for a digital camera which style is shown at an upper center of FIG. 28 and the like can be used. A photographing device may be a badge type device that is worn as shown on an upper right side of FIG. 28, or may be a device that can be hung from a neck as shown on a lower left side. A photographing device may be a device that can be hung obliquely from a shoulder as shown at a lower center, or may be a device that can be worn on a head as shown on a lower right side.

The series of processes described above can be carried out by hardware, and also by software. In this case, a device that executes the software is formed by a personal computer as shown in FIG. 29, for example.

Figure 29:
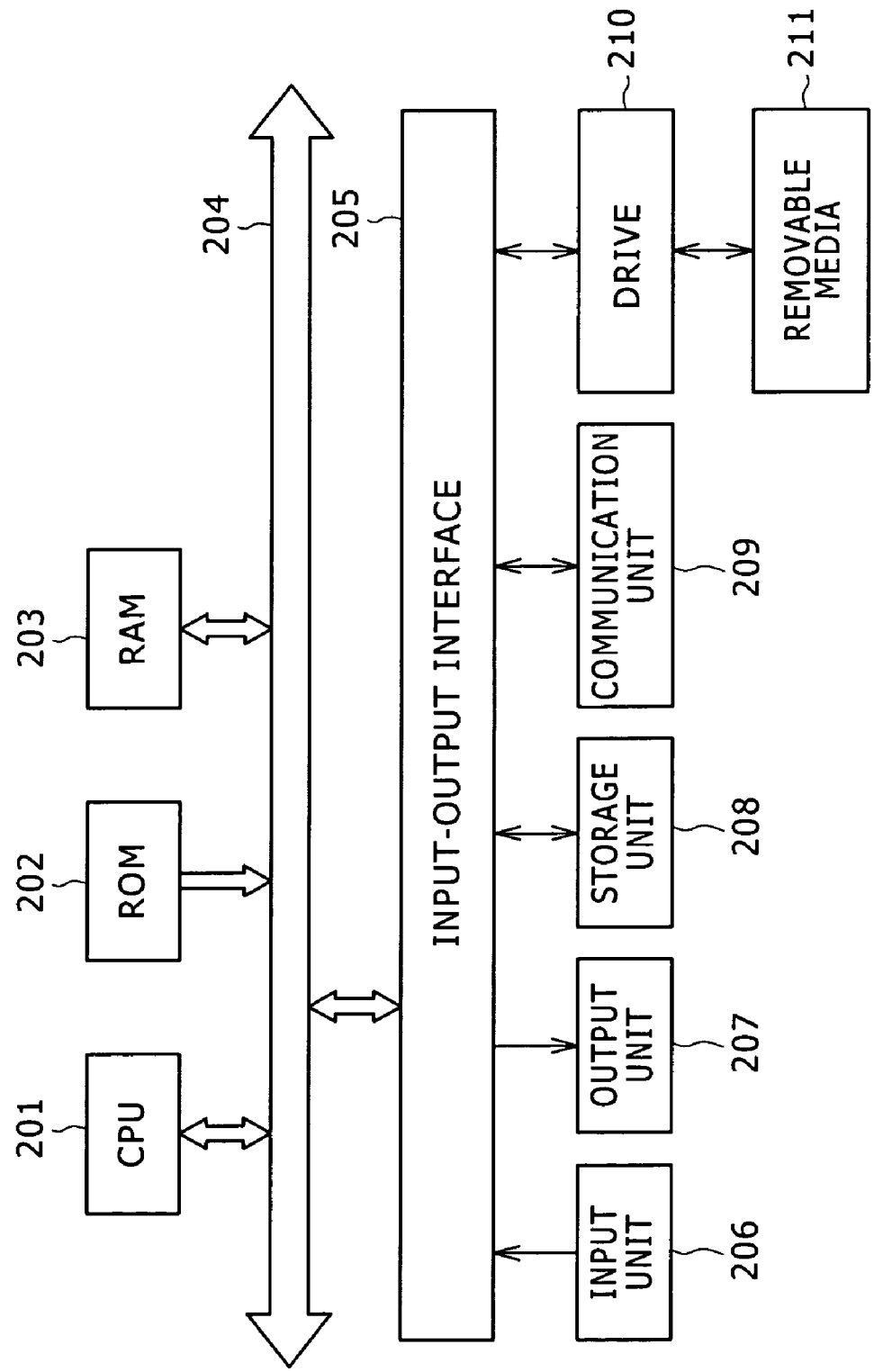
FIG. 29 is a block diagram showing an example of configuration of a personal computer.

A CPU (Central Processing Unit) 201 in FIG. 29 performs various processes according to a program stored in a ROM (Read Only Memory) 202 or a program loaded from a storage unit 208 into a RAM (Random Access Memory) 203. The RAM 203 also stores data and the like necessary for the CPU 201 to perform the various processes as occasion arises.

The CPU 201, the ROM 202, and the RAM 203 are interconnected via a bus 204. The bus 204 is also connected with an input-output interface 205.

The input-output interface 205 is connected with an input unit 206 formed by a keyboard, a mouse and the like, an output unit 207 formed by a display such as an LCD (Liquid Crystal Display), a speaker and the like, the storage unit 208 formed by a hard disk or the like, and a communication unit 209 for performing communication processing via a network.

The input-output interface 205 is also connected with a drive 210 as occasion arises. A removable medium 211 formed by a magnetic disk, an optical disk, a magneto-optical disk, a semiconductor memory or the like is loaded into the drive 210 as occasion arises. A computer program read from the removable medium 211 is installed in the storage unit 208 as occasion arises.

When the series of processes is to be carried out by software, a program constituting the software is installed from a network or a recording medium onto a computer incorporated in special hardware, or a general-purpose personal computer, for example, that can perform various functions by installing various programs thereon.

As shown in FIG. 29, the recording medium is formed by the removable medium 211 distributed to users to provide the program separately from the apparatus proper and having the program recorded thereon, the removable medium 211 being formed by a magnetic disk (including flexible disks), an optical disk (including CD-ROM (Compact Disk-Read Only Memory) and DVD (Digital Versatile Disk)), a magneto-optical disk (including MD (registered trademark) (Mini-Disk)), a semiconductor memory or the like. The recording medium is also formed by the ROM 202, the hard disk included in the recording unit 208, or the like that has the program recorded thereon and which is provided to the user in a state of being preincorporated in the apparatus proper.

It is to be noted that the steps in the present specification include processes carried out in time series in the described order and also processes carried out in parallel or individually and not necessarily in time series.

While a preferred embodiment of the present invention has been described using specific terms, such description is for illustrative purposes only, and it is to be understood that changes and variations may be made without departing from the spirit or scope of the following claims.

What is claimed is:

1. An information processing device, comprising:
   associating means for recognizing an action based on sensor data output by a sensor and obtained in a same timing as a photographing timing of an image string, for extracting a plurality of features from said sensor data, and for recognizing the action based on a time series of the plurality of features using a model for a recognition; and
   display controlling means for displaying a distribution of scenes of the image string for a selection of a reproduction position at a time of a reproduction of said image string, the distribution based on the action.

2. The information processing device according to claim 1, further comprising:
   reproduction controlling means for reproducing one of the scenes of said image string, said one of the scenes associated with the action selected from among a plurality of actions recognizable by said associating means.

3. The information processing device according to claim 1, wherein the display controlling means displays the distribution of scenes associated with respective actions by an action type.

4. The information processing device according to claim 1, wherein said model for the recognition is provided in advance.

5. The information processing device according to claim 1, wherein said sensor is included in one of the information processing device itself and a device having a casing different from a casing of the information processing device.

6. The information processing device according to claim 5, further comprising:
   communicating means for, when said sensor is included in the device having the casing different from the casing of the information processing device, performing radio communication with the device, and for obtaining said sensor data.

7. The information processing device according to claim 1, further comprising:

image processing means for clustering images forming said image string according to contents of the images; and action correcting means for associating one of a plurality of actions with one entire scene formed by images including contents determined to be similar to each other based on a result of a processing by said image processing means.

8. An information processing method implemented by an information processing device, the information processing method comprising:

recognizing an action based on sensor data output by a sensor and obtained in a same timing as a photographing timing of an image string;

extracting a plurality of features from said sensor data; and displaying a distribution of scenes of the image string for a selection of a reproduction position at a time of a reproduction of said image string, the distribution based on the action, wherein the recognizing is defined by recognizing the action, with the information processing device, based on a time series of the plurality of features using a model for a recognition.

9. A computer-readable, non-transitory storage medium encoded with a program for making a computer perform a process comprising:

recognizing an action based on sensor data output by a sensor and obtained in a same timing as a photographing timing of an image string;

extracting a plurality of features from said sensor data; and displaying a distribution of scenes of the image string for a selection of a reproduction position at a time of a reproduction of said image string, the distribution based on the action, wherein the recognizing is defined by recognizing the action based on a time series of the plurality of features using a model for a recognition.

10. A photographing device, comprising:

photographing means;

associating means for recognizing an action based on sensor data output by a sensor and obtained in a same timing as a timing of a photographing of an image string by said photographing means, for extracting a plurality of features from said sensor data, and for recognizing the action based on a time series of the plurality of features using a model for a recognition; and display controlling means for displaying a distribution of scenes of the image string for a selection of a reproduction position at a time of a reproduction of said image string, the distribution based on the action.

11. An information processing device, comprising:

a processing unit configured to recognize an action based on sensor data output by a sensor and obtained in a same timing as a photographing timing of an image string, to extract a plurality of features from said sensor data, and to recognize the action based on a time series of the plurality of features using a model for a recognition; and an interface configured for a display of a distribution of scenes of the image string for a selection of a reproduction position at a time of a reproduction of said image string, the distribution based on the action.

12. A photographing device, comprising:

a camera unit;

an associating section configured to recognize an action based on sensor data output by a sensor and obtained in a same timing as a timing of a photographing of an image string by said camera unit, to extract a plurality of features from said sensor data, and to recognize the action based on a time series of the plurality of features using a model for a recognition; and an interface configured for a display of a distribution of scenes of the image string for a selection of a reproduction position at a time of a reproduction of said image string, the distribution based on the action.

* * * * *